(12) United States Patent
Voss et al.

(10) Patent No.: US 11,691,334 B2
(45) Date of Patent: Jul. 4, 2023

(54) POWDER DISTRIBUTION SYSTEM FOR THREE-DIMENSIONAL PRINTER

(71) Applicant: The ExOne Company, North Huntingdon, PA (US)

(72) Inventors: Lawrence Joseph Voss, Pittsburgh, PA (US); Joseph J. Bolt, Irwin, PA (US); Anthony S. Dugan, McKeesport, PA (US); Michael John McCoy, Murrysville, PA (US); Daniel T. Brunermer, Leechburg, PA (US); Travis Maxwell Inks, Greensburg, PA (US); Paul P. Knor, Ruffsdale, PA (US)

(73) Assignee: THE EXONE COMPANY, North Huntingdon, PA (US)

( * ) Notice: Subject to any disclaimer, the term of this patent is extended or adjusted under 35 U.S.C. 154(b) by 109 days.

(21) Appl. No.: 16/620,696

(22) PCT Filed: Jun. 12, 2018

(86) PCT No.: PCT/US2018/036803
§ 371 (c)(1),
(2) Date: Dec. 9, 2019

(87) PCT Pub. No.: WO2018/231664
PCT Pub. Date: Dec. 20, 2018

(65) Prior Publication Data
US 2020/0180227 A1    Jun. 11, 2020

Related U.S. Application Data

(60) Provisional application No. 62/592,624, filed on Nov. 30, 2017, provisional application No. 62/544,341, (Continued)

(51) Int. Cl.
*B29C 64/153*    (2017.01)
*B33Y 10/00*    (2015.01)
(Continued)

(52) U.S. Cl.
CPC .............. *B29C 64/153* (2017.08); *B07B 1/40* (2013.01); *B22F 12/52* (2021.01); *B22F 12/67* (2021.01);
(Continued)

(58) Field of Classification Search
CPC ... B29C 64/153; B29C 64/255; B29C 64/329; B29C 64/264; B29C 64/357; B29C 64/35; B29C 64/371
See application file for complete search history.

(56) References Cited

U.S. PATENT DOCUMENTS 6,283,302 B1 * 9/2001 Schulte .................. E21B 21/065
209/403
9,486,962 B1 * 11/2016 Dugan .................... B33Y 40/00
(Continued)

FOREIGN PATENT DOCUMENTS

WO    WO-2008028443 A2 *   3/2008 ........... B29C 64/153

*Primary Examiner* — Joseph S Del Sole
*Assistant Examiner* — Jamel M Nelson
(74) *Attorney, Agent, or Firm* — Philip Lane

(57) ABSTRACT

The present invention relates to apparatuses for distributing build powder in powder-layer three-dimensional printers (2) and for the collection of particulates of the build powder that have become suspended in the gaseous atmosphere in the vicinity of the build platform of the three-dimensional printer. These apparatuses include recoaters (20) that are particularly useful in providing uniform distribution of fine build powder across the width of the build platform or powder bed. The present invention also includes powder-layer three-dimensional printers (2) which comprise such apparatuses for distributing build powder and/or apparatuses for collecting such suspended particulates. The improved fine powder recoater (20) uses an ultrasonic transducer (30) to move powder through a sheet screen (28). The sheet screen (28) may be presented to the powder fed onto it in a narrow dispensing slot to limit the flow rate of powder from (Continued)

the dispenser and to provide control over the amount of powder dispensed. The width of the slot may extend to cover the entire build box fill zone. The ultrasonic transducer (30) is preferably adapted to periodically sweep through a range of frequencies during operation. The ultrasonic vibration system may be augmented with a low frequency vibration system. The dust collection system (160) draws air from the perimeter of the build box (172) down through the deck plate (170) of the printer (2) and out of the printer's housing (164) to an external dust collector (250).

16 Claims, 16 Drawing Sheets

Related U.S. Application Data filed on Aug. 11, 2017, provisional application No. 62/518,122, filed on Jun. 12, 2017.

(51) Int. Cl.
  *B33Y 30/00* (2015.01)
  *B33Y 40/00* (2020.01)
  *B29C 64/329* (2017.01)
  *B29C 64/255* (2017.01)
  *B29C 64/209* (2017.01)
  *B29C 64/35* (2017.01)
  *B29C 64/205* (2017.01)
  *B07B 1/40* (2006.01)
  *B22F 12/52* (2021.01)
  *B22F 12/67* (2021.01)
  *B22F 10/14* (2021.01)
  *B22F 10/28* (2021.01)
  *B22F 12/90* (2021.01)

(52) U.S. Cl.
  CPC .......... *B29C 64/205* (2017.08); *B29C 64/209* (2017.08); *B29C 64/255* (2017.08); *B29C 64/329* (2017.08); *B29C 64/35* (2017.08); *B33Y 10/00* (2014.12); *B33Y 30/00* (2014.12); *B33Y 40/00* (2014.12); *B22F 10/14* (2021.01); *B22F 10/28* (2021.01); *B22F 12/90* (2021.01)

(56) References Cited

U.S. PATENT DOCUMENTS

| | | | |
|---|---|---|---|
| 2005/0266211 A1* | 12/2005 | Klein | G06K 13/0893 428/174 |
| 2008/0006958 A1* | 1/2008 | Davidson | B33Y 40/00 425/72.1 |
| 2015/0266211 A1* | 9/2015 | Wolfgang | B33Y 40/20 425/424 |
| 2017/0066190 A1* | 3/2017 | Klein | B29C 64/153 |

* cited by examiner

POWDER DISTRIBUTION SYSTEM FOR THREE-DIMENSIONAL PRINTER

BACKGROUND

Field of the Invention

The present invention relates to powder-layer three-dimensional printers and methods of making articles thereby.

Background of the Invention

There are today various types of three-dimensional printers, i.e. devices that convert electronic representations of three-dimensional articles into the articles themselves by the systematic building-up of one or more materials. The apparatuses of the present invention find particular utility with the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-based three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Alternatively, the build platform remains stationary and the powder deposition and image imparting components are indexed upward. Selected portions of selected powder layers are treated to bind the powders in those portions together as the three-dimensional article is formed. Collectively, the portions of the deposited powder layers which are not bound together are referred to herein as a "powder bed."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed to form a powder layer. In some powder-layer three-dimensional printers, each powder layer is deposited upon the build platform or the extant powder bed by a traveling powder dispenser, which may or may not include some device which is adapted to level the top of the powder layer.

The process of forming a powder layer is sometimes referred to in the art, and is referred to herein, as "recoating." The device or combination of devices of a particular powder-layer three-dimensional printer that accomplishes the recoating is sometimes referred to in the art, and is referred to herein, as a "recoater."

Although the recoaters existing in the art today generally work well for their intended purposes, there is still a need in the art to develop recoaters which consistently provide good powder layer uniformity, especially for fine build powders, i.e. build powders which have average particle sizes ($d_{50}$) of less than 20 microns. Those familiar with the prior art may recall that improvements in the use of fine powders in powder-layer three-dimensional printers are taught by the following patent publications which are owned by the Applicant of the instant application: WO 2016/176432 A1 titled "Powder Recoater for Three-Dimensional Printer"; WO 2017/040521 A1 titled "Selectively Activated Mesh Discharge Powder Recoater for Three-Dimensional Printing"; and WO 2017/040521 A1 and U.S. Pat. No. 9,486,962 B1 both titled "Fine Powder Recoater for Three-Dimensional Printer". By way of the instant application, the present invention discloses additional improvements to this field of technology.

Two prevalent problems with the use of fine build powders are (a) the difficulty to create uniform layers over the entire print bed and (b) the propensity of the fine powders during deposition onto the build bed to "plume", i.e. to be suspended in very slight drafts so as to be carried away by the drafts to other areas of the three-dimensional printer. Those skilled in the art will understand that the difficulty to create uniform layers with fine build powders becomes particularly acute when the thickness of the layer is minimized in an effort to acquire fine feature resolution on the surface of the article being built. The skilled person will also understand that plume-causing drafts may be present in the build area due to the operation or movement of components, fans, thermal gradients, intentional gas flows, and even the impact of the build powder with the build bed. The former problem is present in all types of powder-layer three-dimensional printers, whereas the latter problem is not present or present in a diminished degree in those powder-layer three-dimensional printers in which the build area is maintained in a vacuum or near vacuum, e.g. electron beam melting three-dimensional printers.

Another problem inherent in forming the powder beds of powder-layer three-dimensional printer is the large amount of excess powder (as that term is defined later) that is needed to compensate for the lack of uniformity of powder dispensing across and along the powder bed. The lack of uniformity and excess powder problems become amplified when fine powders are used because of the tendency to use thinner layers with decreased powder size.

SUMMARY OF THE INVENTION

The present invention includes apparatuses and methods for three-dimensionally printing fine build powders in powder-layer three-dimensional printers which provide improved solutions to one or more of the foregoing problems.

In at least some embodiments of the present invention, the recoaters of the powder-layer three-dimensional printers pelletize the build powder as the build powder is being dispensed onto a build bed. For ease of reference the resulting pellets are referred to hereinafter as "build powder pellets". In these embodiments, the build powder pellets are formed by the application of ultrasonic vibrations to a sheet screen (as that term is defined below) as the build powder passes through and is pelletized by the sheet screen. This pelletization largely prevents the falling fine build powder of the build powder pellets from being caught in air (or other gas) currents during their fall to or impact with the build bed, thereby greatly reducing the amount of pluming normally associated with dispensing fine powders.

In at least some embodiments of the present invention, the recoaters of the powder-layer three-dimensional printer dispense the build powder more uniformly across and along the powder bed thus allowing for the use of less excess powder (as that term is defined below).

The present invention provides powder-layer three-dimensional printer having apparatuses for the collection of particulates of the build powder that have become suspended in the gaseous atmosphere in the vicinity of the build box of the powder-layer three-dimensional printer.

The recoaters of the present invention include a build powder hopper which is adapted to provide build powder to the top side of a sheet screen (as that term is defined below). The recoaters also include one or more ultrasonic transducers adapted to vibrate the sheet screen at frequencies at or above about 20,000 Hz, i.e. in the ultrasonic range. In some embodiments, the recoaters also include a low frequency, i.e. sonic frequency, vibrator which is adapted to assist the build powder to flow from the hopper to the sheet screen.

Some of the recoaters of the present invention provide a reduced minimum dispensing rate (as that term is defined below) required for reliable uniform coverage as compared to conventional recoaters. For example, some recoater embodiments permit 200% as an upper limit of the minimum dispersing rate as opposed to 400% or greater for some conventional recoaters. This allows for full build box depth builds without overflowing the collection chutes of or associated with the build box.

The modular design of preferred recoater embodiments allows for variations of the sheet screens to accommodate powders with different particle size distributions, densities, and flow characteristics.

Some embodiments of the present invention provide for localized dust collection around the perimeter of the build box. Collecting the dust at or near its source significantly reduces dispersion of fine particles within the machine work area, greatly reducing machine contamination.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIG. 15A is a top plan view of a first sheet screen embodiment.

FIG. 15B is a top plan view of a second sheet screen embodiment.

FIG. 15C is a top plan view of a third sheet screen embodiment.

FIG. 19 is a photograph of the top side of a deck without a build box or a shroud in place.

FIG. 20 is a photograph of the deck of FIG. 19 with a build box and a shroud in place.

FIG. 21 is a photograph of a portion of the interior of the housing of the powder-layer three-dimensional printer below the deck. This view is looking upward at the bottom of the deck.

FIG. 22 is a photograph of the portion of the exterior of the housing of the powder-layer three-dimensional printer where the exhaust port is attached to the housing.

FIG. 23 is a photograph of an external dust collection unit to which is connected an external duct.

FIG. 25A depicts a first sheet screen with a hole having a straight sidewalls.

FIG. 25B depicts a second sheet screen with a hole having a sidewall comprising upper and lower bevels which meet at about mid-height of the hole.

FIG. 25C depicts a third sheet screen with a hole having a sidewall comprising an upper bevel, a straight wall section, and a lower bevel.

FIG. 25D depicts a fourth sheet screen with a hole having a sidewall comprising upper and lower bevels which meet below the mid-height of the hole.

FIG. 25E depicts a fifth sheet screen with a hole having a sidewall comprising upper and lower bevels which meet above the mid-height of the hole.

FIG. 25F depicts a sixth sheet screen with a hole having a sidewall which slopes continuously inward from the top to the bottom of the hole.

DESCRIPTION OF PREFERRED EMBODIMENTS

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, the range includes its end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention. It is to be understood that whenever particular features are described with regard to any particular embodiment, it is within the scope of the present invention to combine those features, so far as may be practicable, with any of the features described with regard to any of the other embodiments taught herein.

As mentioned above in the Background section, the problems in the art of using fine build powders with powder-layer three-dimensional printers include the difficulty of creating uniform layers, reducing the amount of excess powder (as that term is defined later), and pluming. Each of two significant aspects of the present invention (which can be used alone or in combination with the other) address one or more of these problems. These aspects are, respectively, improved recoaters and plume collection systems. These aspects are discussed in turn below.

For conciseness, the improved recoaters and plume collection systems of the present invention are described at some points below in conjunction with binder-jet three-dimensional printing. However, it is to be understood that the recoaters of the present invention are usable with any type of powder-layer three-dimensional printer and the plume collection systems of the present invention are usable with any type of powder-layer three-dimensional printer in which the three-dimensional printing is conducted under a gaseous atmosphere.

Figure 1:
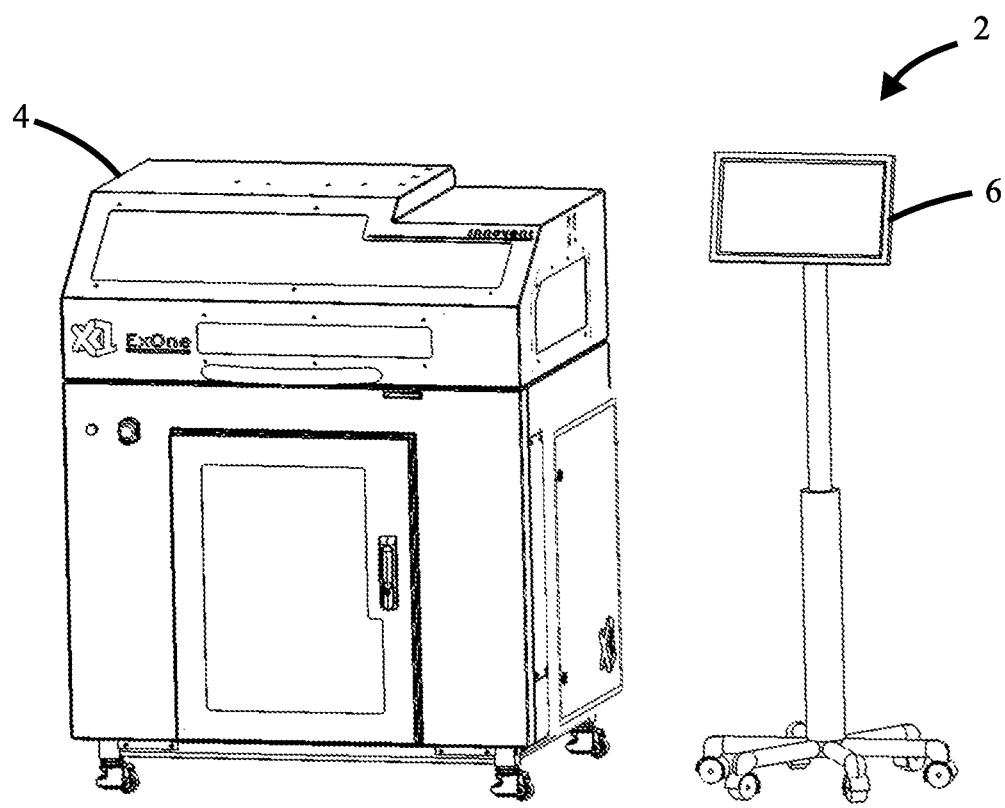
FIG. 1 is a perspective view of a prior art binder-jet three-dimensional printer manufactured by The ExOne Company under the trademark Innovent®.
Figure 2:
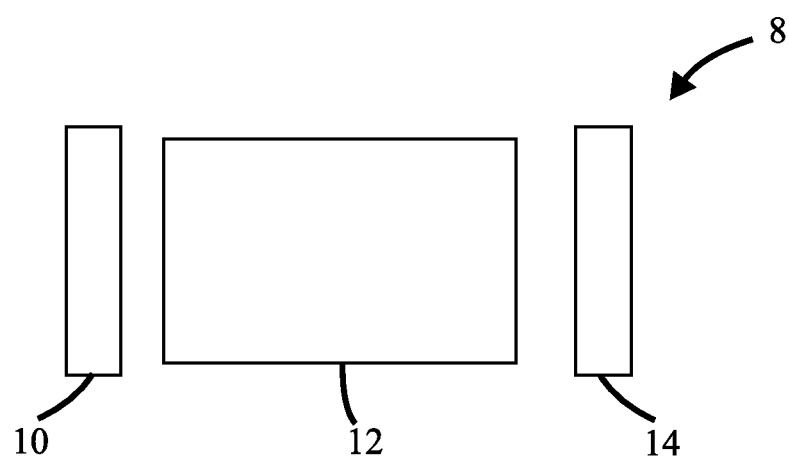
FIG. 2 is a planar schematic representation of the build area portion of the prior art binder-jet three-dimensional printer of FIG. 1.

An example of a binder-jet three-dimensional printer is illustrated in FIGS. 1 and 2. FIG. 1 shows a perspective view of a prior art powder-layer three-dimensional printer 2, i.e. a binder-jet three-dimensional printer manufactured by The ExOne Company of North Huntingdon, Pa., US, under the trademark Innovent®. The printer 2 has an enclosed printing station 4 and a touchscreen input control station 6 which is connected to the printing station 4. FIG. 2 shows a planar schematic representation of the build area 8 of the printing station 4. Located in the build area 8 are a recoater 10, a build box 12, and an image forming device in the form of printhead 14. The build box 10 is equipped with a vertically indexible platform (not depicted) upon which layers of a build powder may be deposited to form a print bed in which one or more desired three dimensional articles may be constructed. The recoater 10 is adapted to controllably move over the build box 12 to controllably deposit individual build powder layers onto the print bed. The printhead 14 is adapted to controllably move over the build box 12 to selectively impart the image of a two-dimensional slice of the three-dimensional article being formed to the powder layer that lies atop the print bed by inkjet printing a binder onto preselected portions of the powder layer. The sequence of powder layer formation followed by image imparting is repeated until the article has been formed. The build areas and article building sequence of selective sintering three-dimensional printers and electron beam melting three-dimensional printers are similar with the printhead 14 being replaced by a laser system in the case of the former and by an electron beam system in the case of the latter as the image forming devices.

Improved Recoater

The present invention provides an improved recoater having an improved dispensing system that uses ultrasonic vibration (20 kHz or greater, preferably 20 kHz to 100 kHz, and more preferably 30 kHz to 80 kHz) and a perforated sheet screen to achieve improved volumetric control and uniformity of deposition. For convenience of reference, the term "sheet screen" is defined to mean perforated screens manufactured from sheet material. Preferably, the perforation is accomplished by photo etching or laser milling, but any method of machining may be used. The recoater may also include a small diameter roller and an overhead drying or curing device. Nonetheless, it is within the scope of the present invention to use other layer smoothing devices, e.g. a larger diameter roller and/or a doctor blade, and other drying or curing devices or to eliminate one or more of the smoothing device, the drying device, and the curing device. The modularity of preferred embodiments of the recoater makes it relatively easy to change the supply hopper, the geometry of the dispensing slot (width and angle), and hole configuration (size, shape, distribution, and open area percentage) of the sheet screen.

Figure 3:
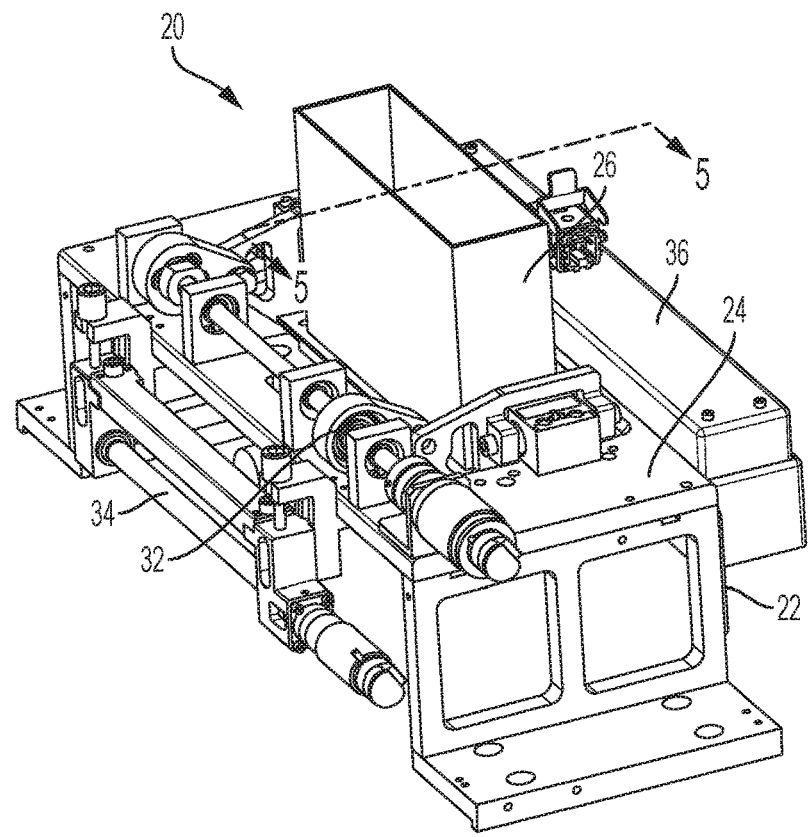
FIG. 3 is a perspective side view of a first recoater embodiment mounted on a supporting trolley.
Figure 4:
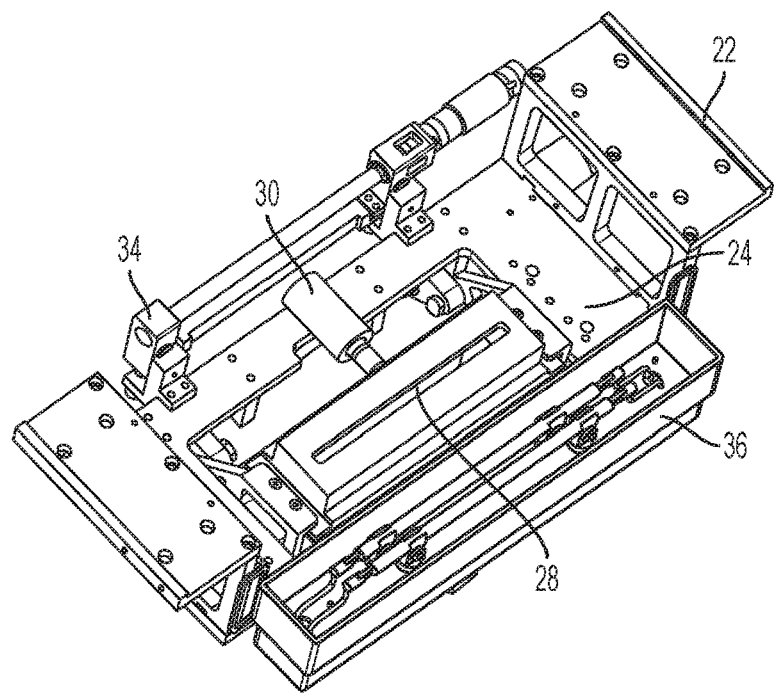
FIG. 4 is a perspective bottom view of the recoater of FIG. 3.
Figure 5:
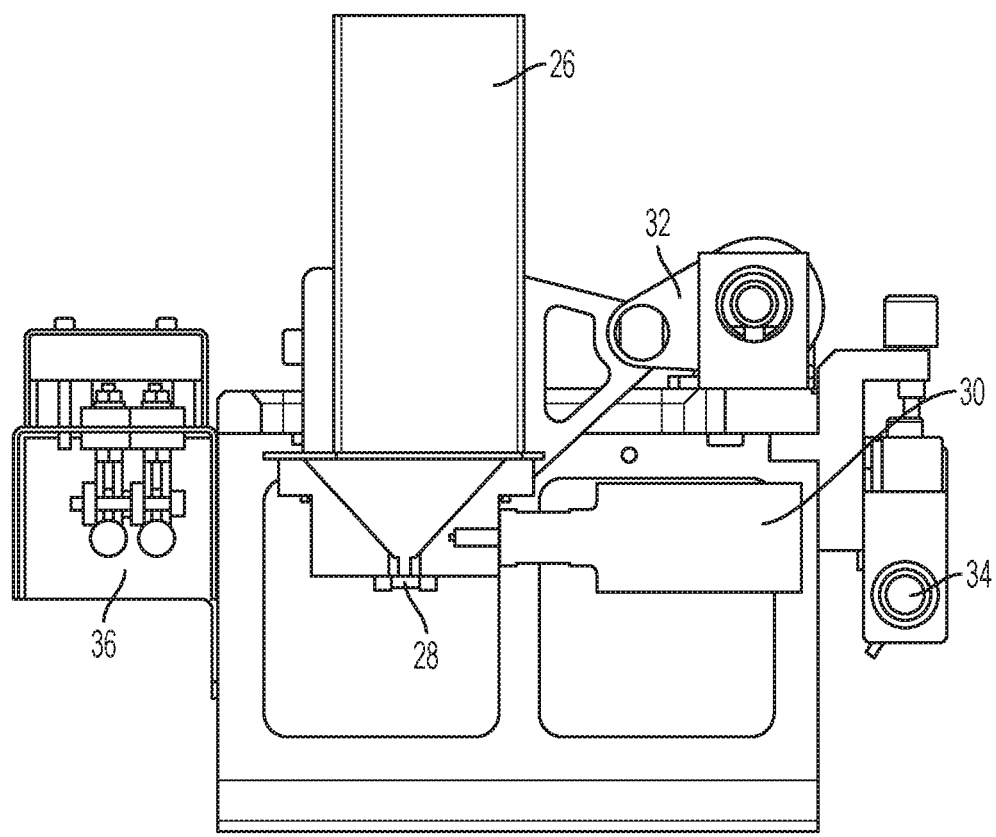
FIG. 5 is a schematic cross-sectional side view of the recoater of FIG. 3 taken along the cutting plane 5-5 shown in FIG. 3

FIGS. 3-5 illustrate a first recoater embodiment, i.e. a recoater 20, which is suitable for uniformly depositing fine build powders. The recoater 20 is shown in the drawing mounted on a supporting trolley 22 having a deck 24. FIG. 3 presents a perspective side view of the recoater 20. FIG. 4 presents a perspective bottom view of the recoater 20. FIG. 5 shows a schematic cross-sectional side view of the recoater 20 taken along the cutting plane 5-5 shown in FIG. 3. Referring to FIGS. 3-5, the recoater 20 includes a build powder supply hopper 26, a sheet screen 28, an ultrasonic transducer 30, and a low frequency vibrator 32. The recoater 20 also includes a smoothing device in the form of a small diameter roller 34 and a drying device in the form of a radiation heater 36, both of which are separately mounted to the deck 25 of the trolley 22.

Figure 6:
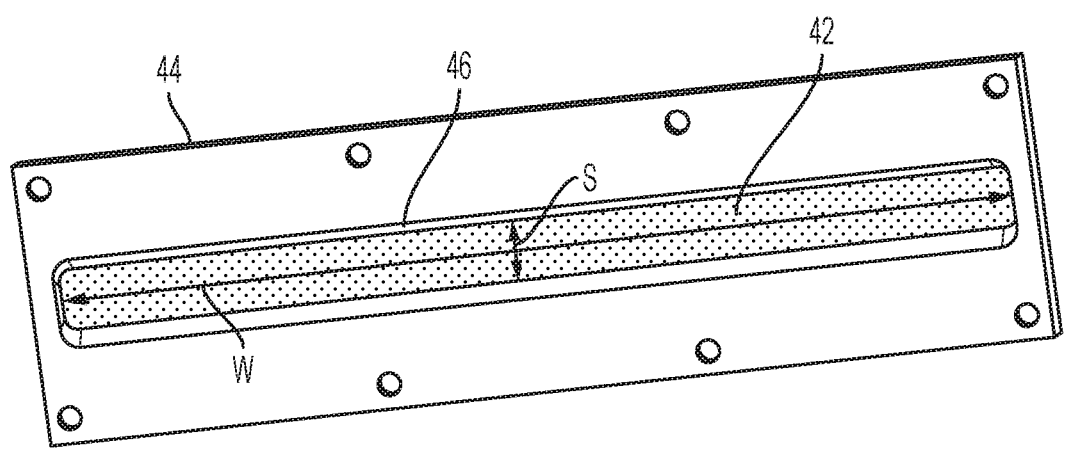
FIG. 6 is a perspective view of the top side of a screen holder and sheet screen of the recoater of FIG. 7.

FIGS. 6-10 illustrate a second recoater embodiment, i.e. a recoater 40. FIG. 6 is a perspective view of the top side (powder receiving side) of the sheet screen 42 and supporting screen holder 44 of the recoater 40. Notice that the screen holder 44 has an optional bevel 46 for directing build powder onto the sheet screen 42. The bevel 46 also prevents the periphery of the junction of the screen holder 44 and the sheet screen 42 from having a right angle edge and corner dead zones into which the build powder could collect as is the case for some less preferred embodiments which do not include such a bevel. The span S and the width W of the sheet screen 42 are also indicated. As used herein in reference to sheet screens, the term "span" is used to indicate the dimension in the direction of travel of the recoater of the portion of the sheet screen 42 that is open for build powder to be dispensed and the term "width" is used to indicate the dimension of that open portion that is perpendicular to the recoater's direction of travel.

Figure 7:
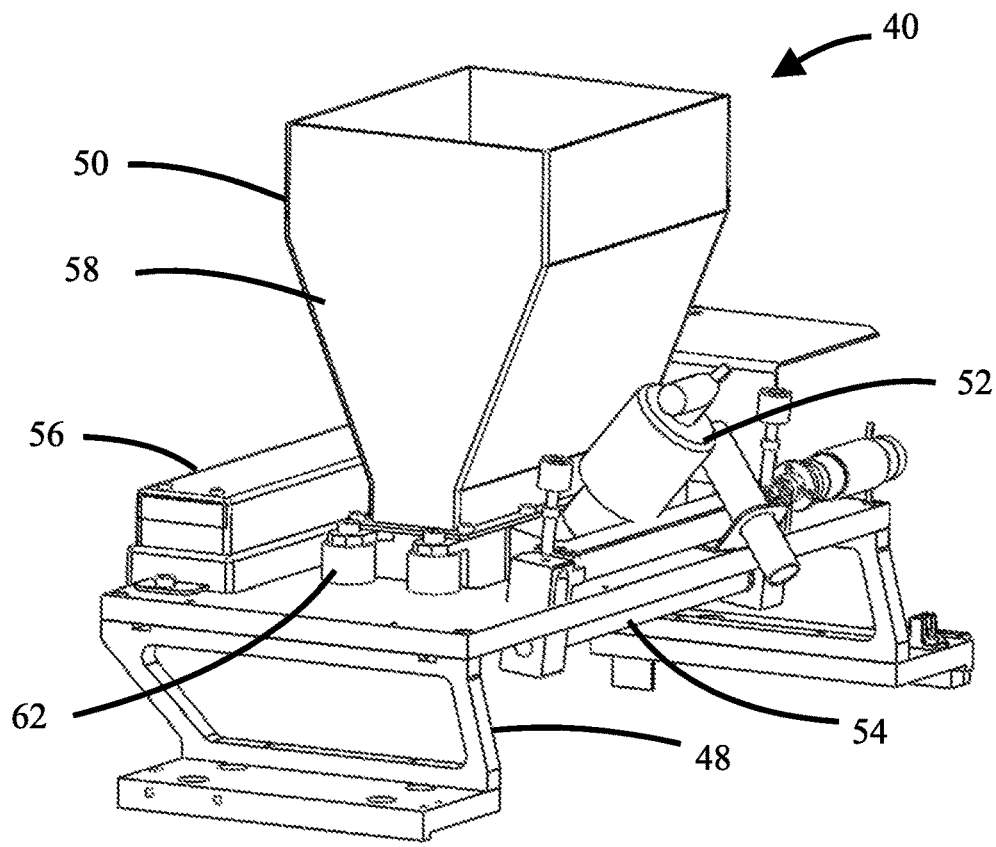
FIG. 7 is a perspective side view of a second recoater embodiment mounted on a supporting trolley.
Figure 8:
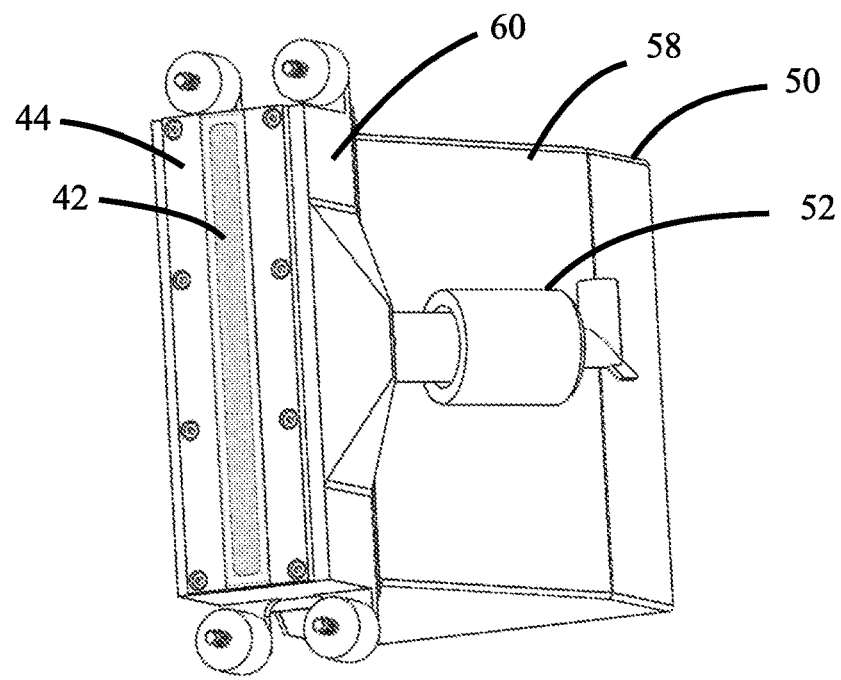
FIG. 8 is a perspective bottom view of a portion of the recoater of FIG. 7 apart from its supporting trolley.
Figure 9:
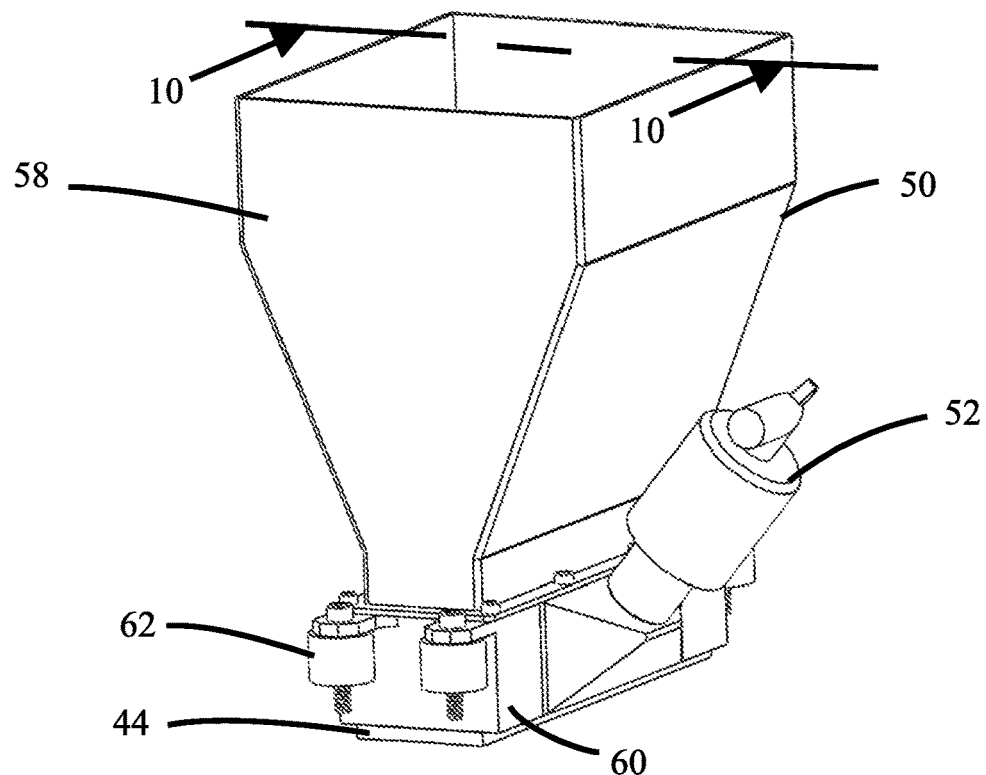
FIG. 9 is a perspective side view of a portion of the recoater of FIG. 7 apart from its supporting trolley.
Figure 10:
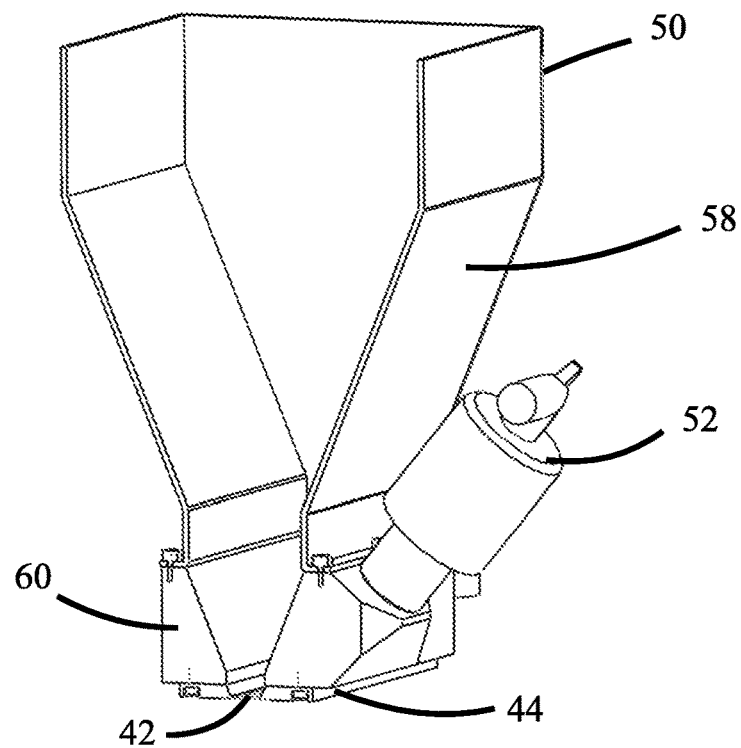
FIG. 10 is a cross-sectional perspective side view of the recoater of FIG. 9 taken along the cutting plane 10-10 shown in FIG. 9.

FIG. 7 is a perspective side view of the recoater 40 mounted on a trolley 48. FIG. 8 is a perspective bottom view of a portion of the recoater 40. FIG. 9 is a perspective side view of a portion of the recoater 40. FIG. 10 is a perspective cross-sectional view of a portion of the recoater 40 taken along cutting plane 10-10 in FIG. 9.

Referring to FIGS. 6-10, in addition to the sheet screen 42 and supporting screen holder 44 already described, the recoater 40 includes a build powder supply hopper 50, and an ultrasonic transducer 52. It also includes a smoothing device in the form of a counter-rotating roller assembly 54, and a drying unit in the form of a radiation heater 56, both of which are mounted separately on the trolley 48. Note that the recoater 40 is mounted to the trolley 48 by way of a plurality of vibration isolation mounts 62.

The hopper 50 comprises a build powder reservoir 58 and a transition body 60. The screen holder 44 is attached to the bottom of the transition body 60. At least one of the reservoir 58 and the transition body 60 are preferably designed to provide mass flow to the build powder when the build powder is exiting the sheet screen 42. The hopper 50 preferably is sized so as to contain enough build powder to fill the powder bed without the need to add powder to the hopper during the printing operation, taking into consideration (a) that a preselected amount of powder is to be retained in the hopper 50 above the sheet screen 42 to assure a uniform controllable output through the sheet screen 42 ("retained powder") during powder dispensing and (b) the amount of "excess powder", i.e. the amount of build powder in excess of the amount needed to fill the build box to the desired level that needs to be dispensed to assure complete layer coverage, the excess powder preferably being shunted from the dispensed layer by a smoothing device into a collection structure for reuse. The amount of excess powder, expressed as a percentage of the amount of powder that is to be retained in the build box during the three-dimensional printing operation, is preferably in the range of about 10 to 300 percent, more preferably in the range of about 10 to 200 percent, and even more preferably in the range of about 10 to 100 percent. The amount of excess powder is sometimes referred in the art as "minimum dispensing rate" even though the word "rate" is a misnomer in this context.

Figure 11:
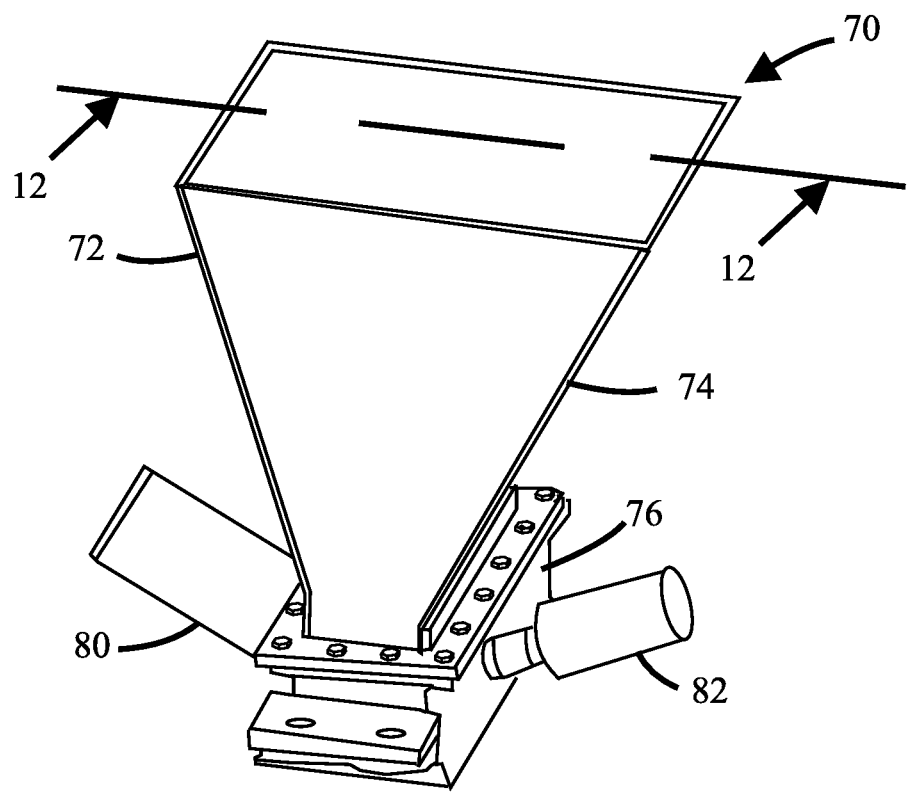
FIG. 11 is a perspective side view of a third recoater embodiment.
Figure 12:
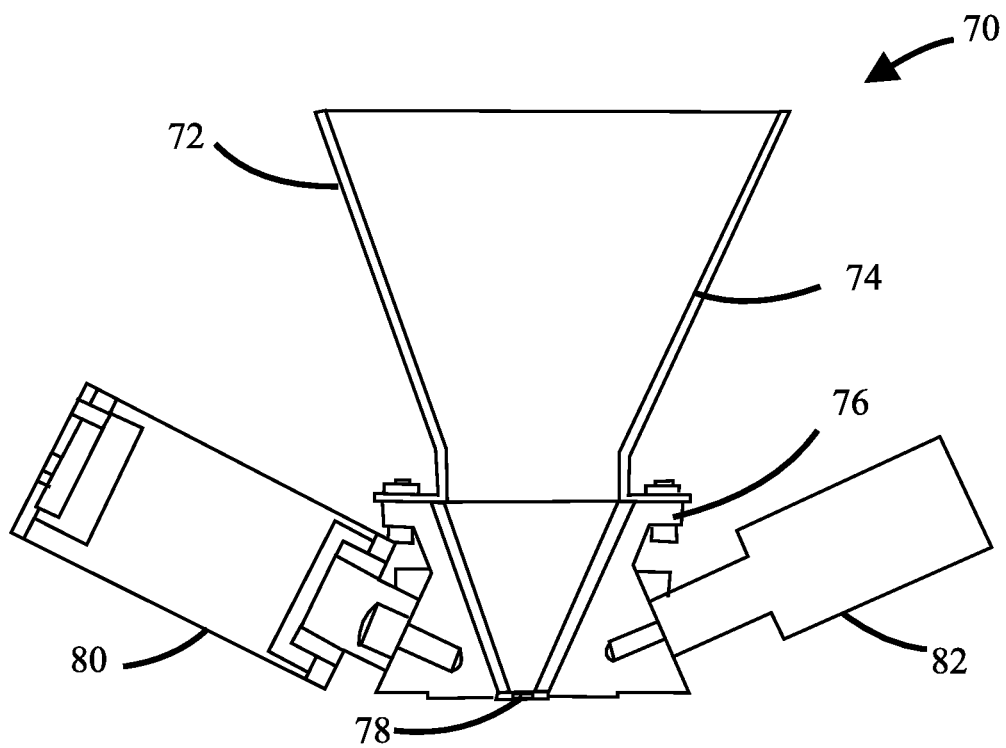
FIG. 12 is a cross-sectional side view of the recoater of FIG. 11 taken along the cutting plane 12-12 shown in FIG. 11.

FIGS. 11 and 12 illustrate a third recoater embodiment, i.e. a recoater 70. FIG. 11 is a perspective side view of the recoater 70. FIG. 12 is a cross-sectional view of the recoater 70 taken along cutting plane 12-12 of FIG.11. The recoater 70 includes a build powder hopper 72 which includes a build powder reservoir 74 and a transition body 76 to which is attached a sheet screen and holder combination 78. Note that the recoater 70 includes two ultrasonic transducers, i.e. first and second ultrasonic transducers 80, 82. The first and second ultrasonic transducers 80, 82 may be the same as or different from one another. They may be run simultaneously, alternatively, overlappingly, or singly. The vibrational characteristics of the first and second ultrasonic transducers 80, 82 may be the same as or different from one another. Such vibrational characteristics include, inter alia, vibrational amplitude, frequency, frequency range, frequency range variation cycle, and duty cycle.

Figure 13:
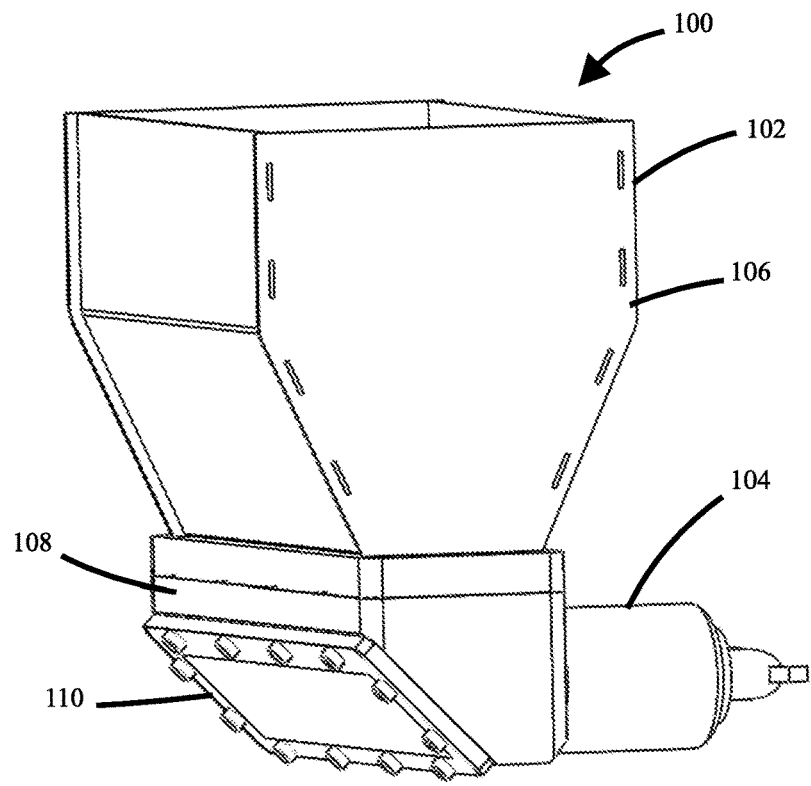
FIG. 13 is a perspective side view of a fourth recoater embodiment.

It is to be understood that the hopper of the present invention may have configurations other than those shown in the preceding drawings. In some embodiments, the transition body is adapted to position the screen at an angle relative to the horizontal that is in the range of about 20 to 70 degrees, and more preferably in the range of about 30 to 50 degrees. FIG. 13 shows such a recoater embodiment, i.e. a recoater 100. The recoater 100 has a build powder supply hopper 102 and an ultrasonic transducer 104. The hopper 102 includes a build powder reservoir 106 and a transition body 108 to which a sheet screen and holder combination 110 is attached at an angle from the horizontal.

It is also to be understood that in some embodiments of the present invention, the ultrasonic transducer may be positioned differently than shown in the preceding drawings. It is within the scope of the present invention that the ultrasonic transducer be positioned horizontally or at any angle to the horizontal or at any angle to the direction of recoater travel or any combination thereof. Preferably, the ultrasonic transducer is positioned so as to apply to the sheet screen a vibration having both a horizontal component and a vertical component with both components being within a plane which is parallel to the recoater's direction of travel. More preferably, the magnitudes of the horizontal and vertical components of the vibration are within about 50 percent of each other, and more preferably within about 20 percent of each other.

The build powder dispensing systems, i.e. recoaters, of the present invention significantly reduce the amount of powder that needs to be dispensed onto the powder bed during the three-dimensional printing process. Using these systems, a maximum amount of powder that is required to be dispensed is preferably no more than twice (200%) the amount of build powder that becomes contained in the powder bed, i.e. the excess powder amount is 100%. For example, if a layer requires 2.0 grams of build powder, no more than 4 grams will need to be dispensed to ensure reliable layer coverage. In contrast, previous systems required the dispensing of four (400%) or more times powder that becomes contained in the powder bed, i.e. the excess powder amount is 300%. The inventive recoaters make it possible to avoid overflowing the excess-powder collection chutes around a build box during the building of articles with the powder-layer three-dimensional printer.

The powder supply hopper preferably is designed to hold enough build powder so that it is not necessary to add build powder to the hopper during the three-dimensional printing operation or to stop the three-dimensional printing operation in order to add build powder to the hopper. In some cases, the hopper will hold a volume of build powder sufficient to perform a full build at 200% minimum dispensing rate, i.e. with two times the amount of build powder required for each layer being dispensed for the layer, plus the amount of retained powder required to ensure controllable build powder dispensing through the sheet screen. It is to be understood that the powder supply hopper may hold lesser amounts of powder than described previously in this paragraph and that build powder may be added to the powder supply hopper during the operation of the powder-layer three-dimensional printing article building process.

Recoater embodiments use an ultrasonic transducer (also referred to in the art as an "ultrasonic piezoelectric converter" or as an "ultrasonic vibrator") to move build powder through the holes of a sheet screen. In some cases, the ultrasonic vibration system may be augmented with a sonic frequency mechanical vibration system.

It is to be understood that the term "ultrasonic transducer" as used herein includes, in addition to the electronic unit that produces the ultrasonic vibrations, a support structure for the electronics, a connection portion (sometimes known in the art as a "horn"), and a control system for operating the electronic unit. The ultrasonic transducer may be chosen to be of the type that provides an essentially constant frequency output or of the type that provides a periodic sweep through a range of frequencies or of the type that otherwise utilizes frequencies across a range of frequencies. For example, an ultrasonic transducer type that sweeps across the frequency range of from about 34 kHz to 37 kHz has been found to be particularly effective with a spherical alloy 316 stainless steel powder having a 9 micron $d_{50}$ particle size as it provides an unexpectedly consistent powder flow. Without intending to be bound, it is speculated that sweeping through a frequency range helps to break up bridging of the build powder in the hopper as it develops or prevents bridging from occurring in the first place that would otherwise occur with the application of a constant frequency by moving the location of the nodes and antinodes associated with the ultrasonic waves.

The application of the ultrasonic vibrations can be done at a constant amplitude or at varying amplitudes.

In some embodiments, the ultrasonic transducers include electronics that incorporate one-time or periodic automatic tuning to adjust at least one of the frequency and the amplitude of the output vibrations to achieve a desired level of build powder flow or of build powder flow consistency through the sheet screen.

Figure 14:
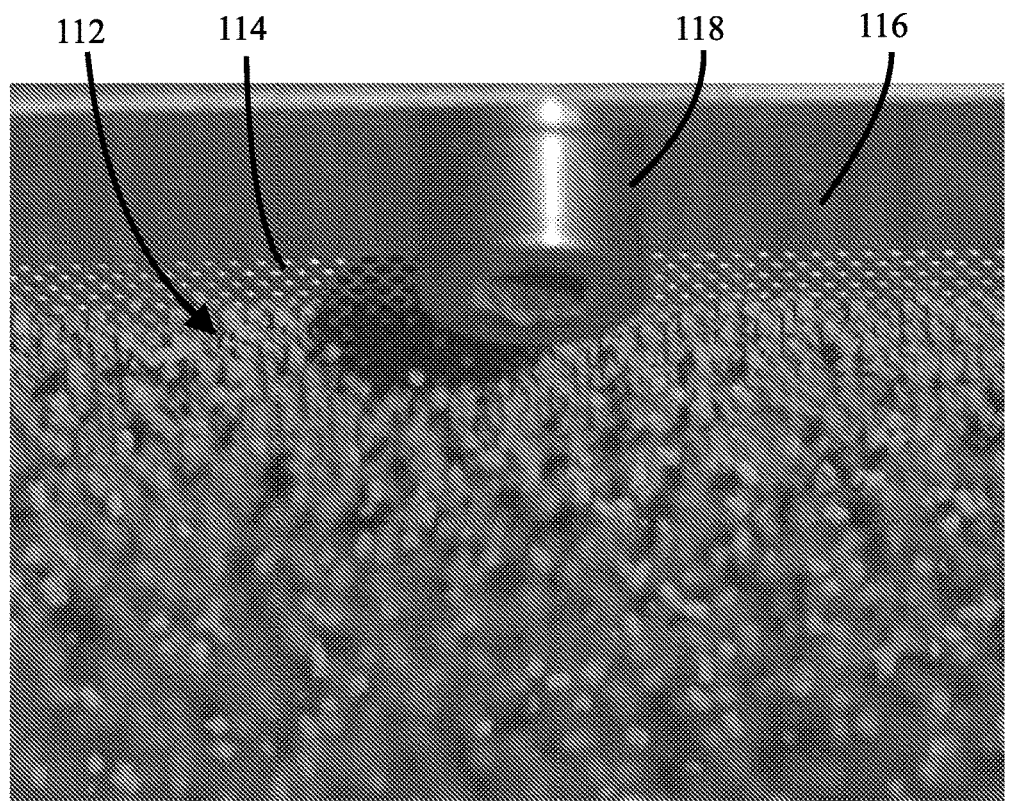
FIG. 14 is a photograph showing the formation of a plurality of build powder pellets formed by the ultrasonic transducer-driven passing of the build powder through the holes in the sheet screen during the operation of an embodiment.

An unexpected benefit of the application of ultrasonic vibration to initiate and continue the flow of the build powder through the sheet screen is that the vibration may loosely compact the powder together within the holes of the screen so that the build powder exits the holes in a form having the appearance of extruded logs, the bottom parts of which break off due to gravity and/or vibration as pellets containing multiple build powder particles which fall onto the powder bed where they may or may not break up on impact. These are the build powder pellets as defined above. This unexpected compaction largely prevents the falling fine powder of the build powder pellets from being caught in air (or other gas) currents during their fall to the powder bed, thereby greatly reducing the amount of pluming normally associated with dispensing fine powders. FIG. 14 is a photograph showing the formation of a plurality of build powder pellets 112 formed by the ultrasonic transducer-driven passing of the build powder through the holes, e.g. the hole 114, of the sheet screen 116. The bolt head 118 visible in this drawing is that of a bolt 118 by which the sheet screen 116 is attached to its frame and to the rest of the recoater of which it is a part. Note that some of the holes near the edge of the sheet screen 116, e.g. the hole 114, are masked from exposure to the build metal powder and so do not have build powder pellets exiting through them. Also note that some of the build powder pellets 112 appear blurry in this photograph as they moved out and away from the focus area of the camera during the taking of the photograph.

The improved fine build powder recoater embodiments include at least one ultrasonic transducer to move the build powder through the perforated holes of a sheet screen. As is described below, in some embodiments, the ultrasonic vibration system is augmented with a low frequency vibration system.

The sheet screens may be made from any material that has the vibration response, durability, and ability to be etched or laser beam or otherwise perforated that is necessary for the application. Preferably, the sheet screens are made from stainless steel, and more preferably from a non-magnetic austenitic stainless steel. The thickness of the sheet screen is chosen to be between about 0.1127 mm (0.0005 inches) and about 0.762 mm (0.030 inches), and more preferably between about 0.0254 mm (0.001 inches) and 0.2032 mm (0.008 inches). The use of a sheet screens allows for tighter control of dispensed build powder volume and uniformity of dispensing across the build bed. Important features of the sheet screens include the size, shape, and distribution of the holes as well as the overall percentage open area of the screen and the shape and size of the sheet between the holes, i.e. the "land area". An example of a land area is identified in FIG. 15A as discussed below.

Although a sheet screen having holes of the same size and shape distributed uniformly across the the screen's surface may be used, it is preferred that one or more of the hole size, hole shape, hole distribution, screen open area, and land area are configured to offset the propensity of the recoater's mechanical system (as determined by using a uniform sieve in place of the sheet screen) which may be due to, inter alia, localized resonances and stiffness variations, to dispense more in some areas across the width of the screen than in other areas. For ease of reference, such mechanical propensities will be referred to by the term "local vibration variances." The examples of sheet screen hole patterns given in FIGS. 15A-15C illustrate some of the possible variations of hole size, distribution, and shape that can be employed to offset local vibration variances to achieve a more uniform dispensing across the width of the bed.

The sheet screen is preferably presented to the build powder fed onto it in a narrow dispensing slot to limit the flow rate of powder from the recoater and to provide control over the amount of powder dispensed. The width of the sheet screen (see dimension W FIG. 6) preferably extends to cover the entire build box fill zone width so that only one pass need be made. However, in some embodiments, the sheet screen width has a shorter width, thus requiring multiple passes be used to cover an entire build box fill zone. The span of the sheet screen (see dimension S in FIG. 6) is preferably selected to be no longer than that which is needed to avoid build powder bridging in the hopper of the recoater. Longer spans may be used, but minimizing the span enhances control of the amount of build powder being dispensed from the recoater through the sheet screen.

Figure 15A:
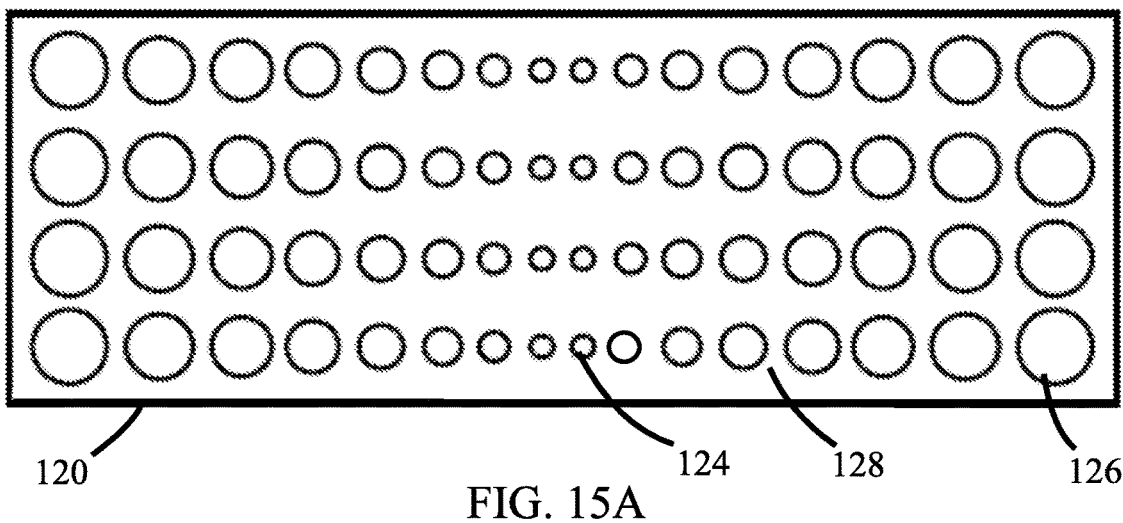
FIGS. 15A-15C illustrate some of the possible variations of hole size, distribution, and shape that can be employed to offset mechanical system propensities to achieve a more uniform dispensing across the width of the bed.
Figure 15B:
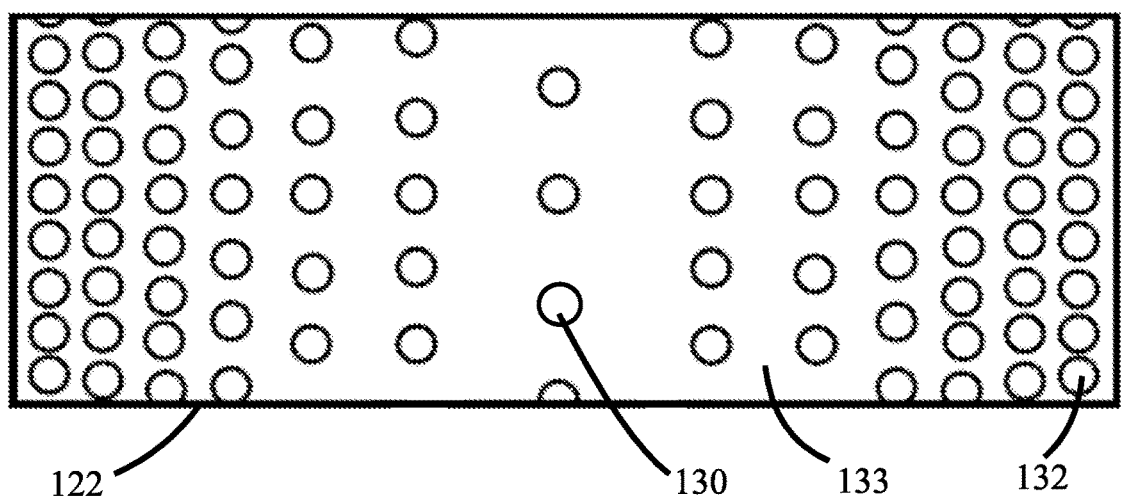

Referring now to FIGS. 15A and 15B, there are shown schematic top plan views of embodiment sheet screens, first and second sheet screens 120, 122, respectively, for use in a recoater embodiment in which the local vibration variances cause the amount of powder dispensed by a conventional screen to vary across the bed width from a high amount at the center to smaller amounts at the edges. Both first and second sheet screens 120, 122 have circular holes. The holes of the first sheet screen 120 vary in diameter from small at the center, e.g. first center hole 124, to large a near the outer edge, e.g. first edge hole 126, and the land areas adjacent to these holes, e.g. first land area 128, vary relative to the adjacent hole sizes. The holes of the second sheet screen 122, e.g. second center hole 130 and second edge hole 132, all have the same size, but the adjacent land areas, e.g. second land area 134, are greater near the center of the sheet screen than they are near the edges.

Figure 15C:
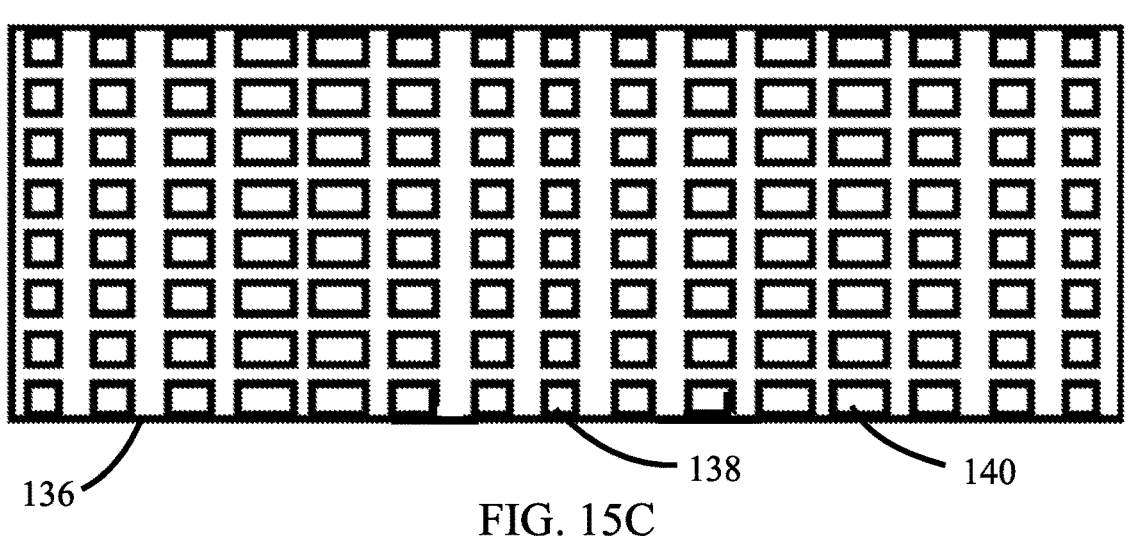

Referring now to FIG. 15C, there is shown a schematic top plan view of a third sheet screen 136 having square and rectangular holes, e.g. third center hole 138 and intermediate hole 140, respectively. Third sheet screen 136 is designed for use in a recoater in which the local vibration variances cause the amount of powder dispensed by a conventional screen to vary across the bed width from a high amount at the center and near the outer edges to smaller amounts in the intermediate areas. As illustrated, the shape of the holes are changed to increase the relative amount of open area in the regions where the local vibration variances would result in a decrease of the amount of powder dispensed from a conventional screen. For example, compare third center hole 138 with third intermediate hole 140.

Figure 16A:
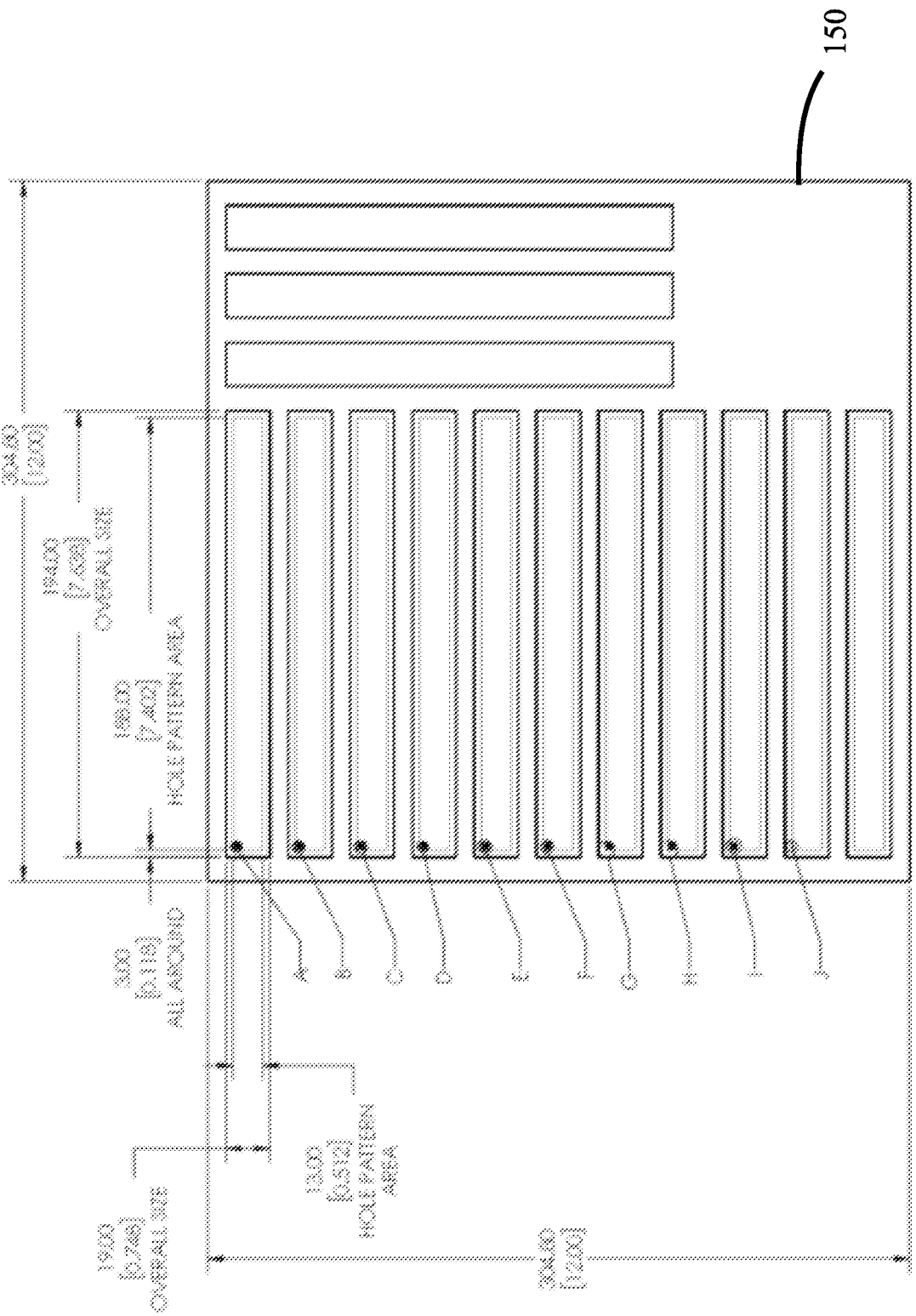
FIG. 16A is a schematic plan view of a sheet of stainless steel showing the layout of a multitude of sheet screens to be perforated and cut out from the sheet. Some of the perforation patterns are indicated in the drawing while some are not. The perforation patterns indicated by letters A-J correspond to those shown in FIGS. 16B and 16C.
Figure 16B:
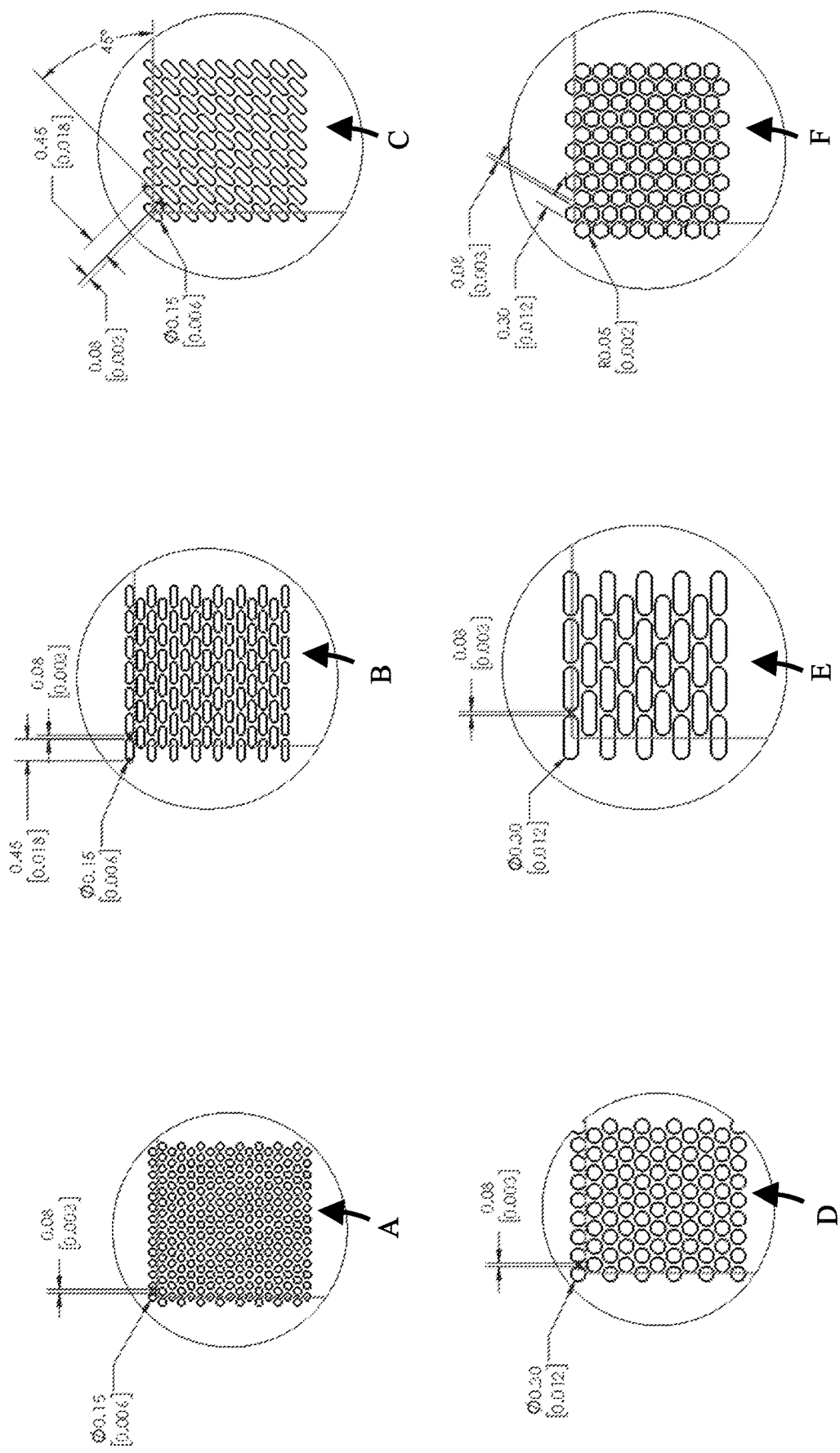
FIG. 16B is a schematic plan view of the perforation patterns indicated as A-F in FIG. 16A.

Referring now to FIG. 16A, there is shown a schematic plan view of a sheet of stainless steel 150 showing the layout of a plurality of sheet screens, e.g. sheet screen 152 having pattern A, to be perforated and cut out from the sheet 150. Some of the perforation patterns are indicated in the drawing, i.e. patterns A-J, while some are not. Illustrative portions of the perforation patterns A-J are shown FIGS. 16B and 16C. In those figures, the unbracketed dimensions are given in millimeters and the bracketed dimensions are are given in inches. The patterns A-J include a variety of hole shapes, combinations, and dispositions. It is to be understood that, although for ease of illustration each of the patterns A-J includes only one hole shape, it is within the scope of the invention for a single sheet screen to include a plurality of different hole shapes.

Figure 16C:
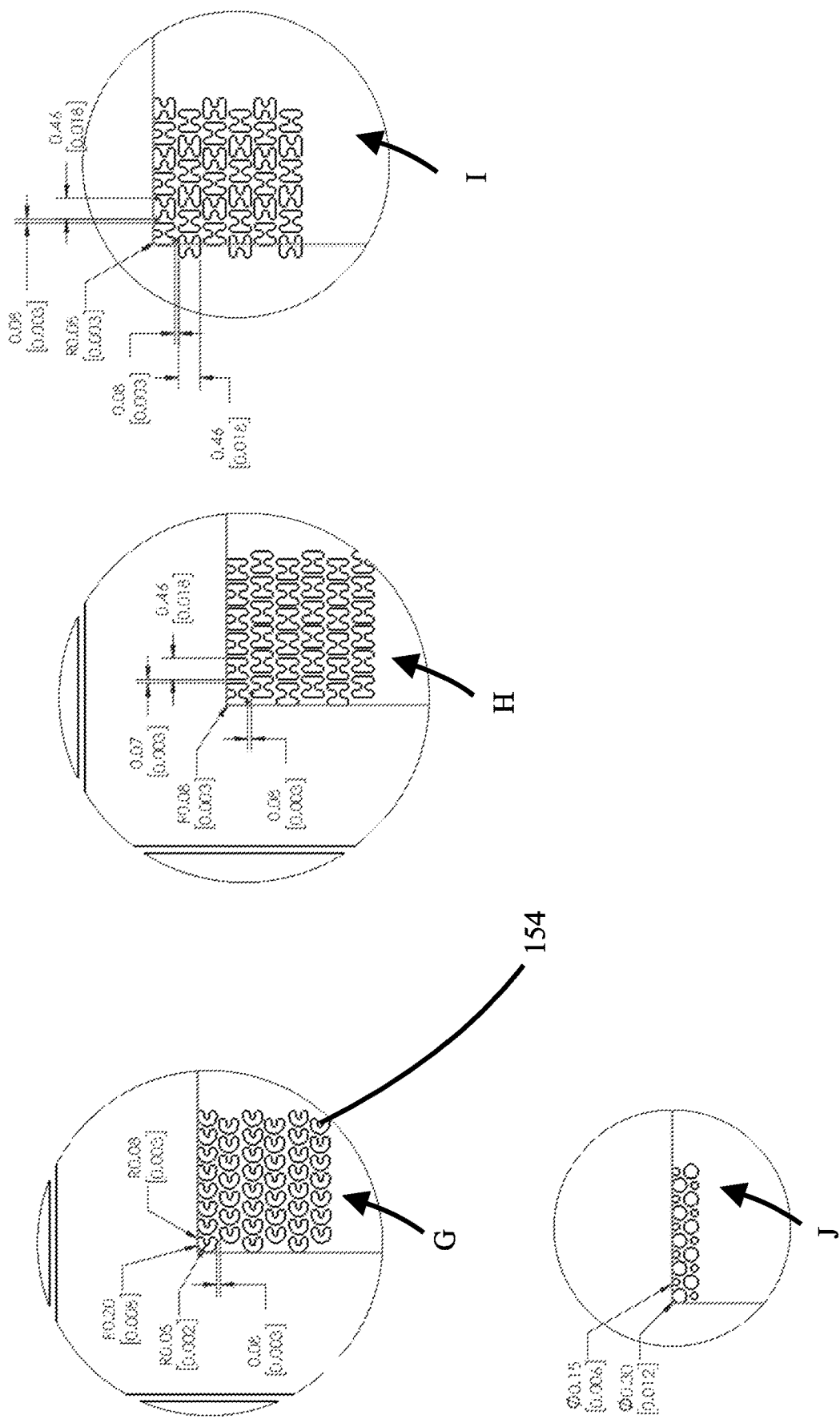
FIG. 16C is a schematic plan view of the perforation patterns indicated as G-J in FIG. 16A.

Referring to FIG. 16C, notice that each of the perforations in those embodiments includes one or more tines, e.g. tine 154. Without intending to be bound, it is believed that the tines enhance the stimulation of the build powder and thereby its flow when the sheet screen is ultrasonically vibrated.

Figure 25A:
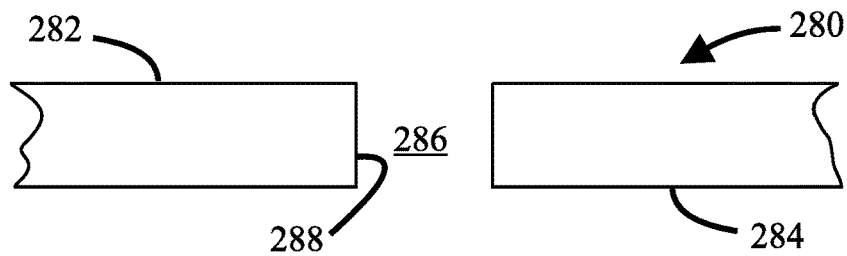
FIGS. 25A-25F are schematic cross-sectional side views of some sheet screens showing some preferred hole profiles of embodiments.

Another characteristic of the sheet screen of the present invention is the profile of each of the perforations through which build powder is to be passed. FIGS. 25A-25F are schematic cross-sectional side views of sheet screens showing some preferred hole profiles. Each of the sheet screens, e.g. first sheet screen 280 of FIG. 25A, is depicted in these drawings so that its top side, e.g. top side 282 of first sheet screen 280, is facing the top of the drawing page and its bottom side, e.g. bottom side 284 of first sheet screen 280, is facing the bottom of the drawing page.

It is to be noted that, although for convenience sake, in FIGS. 25A-25F all surface junctions are shown as sharp angles and all hole sidewall surfaces are shown to be planar, such junctions and surfaces may be rounded. Likewise, although all hole profiles are shown as being symmetrical about the through-centerline of the hole, holes having different profiles on either side of their through-centerlines are also within the scope of the invention. Note also that a sheet screen may have holes having the same hole profiles or any number of different hole profiles.

Figure 25B:
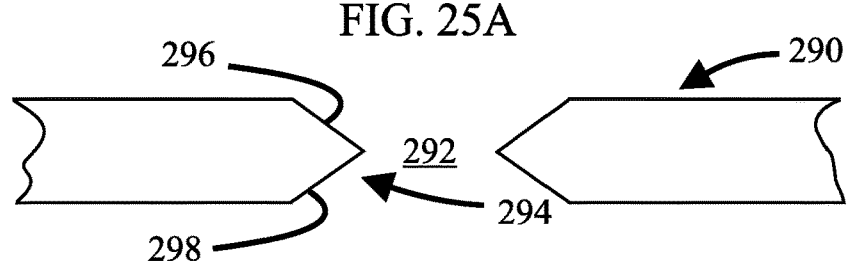
Figure 25C:
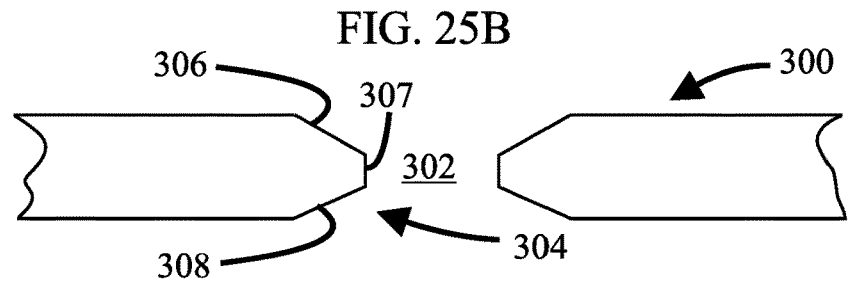
Figure 25D:
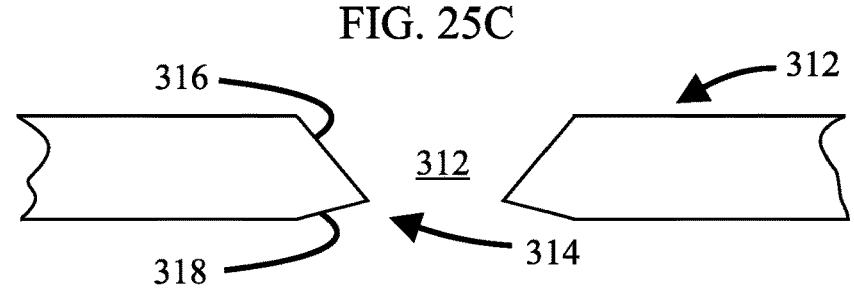
Figure 25E:
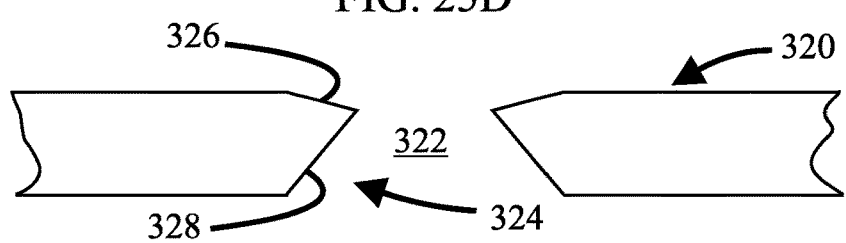
Figure 25F:
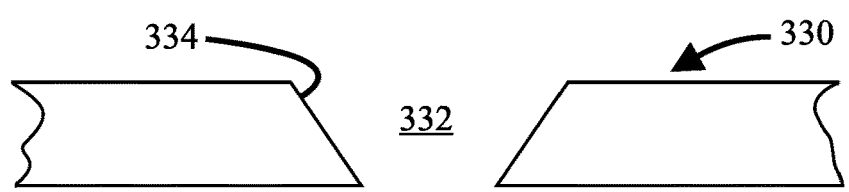

Refer again to FIGS. 25A-25F. In FIG. 25A, the hole 286 of a first sheet screen 280 has straight sidewalls, e.g. first sidewall 288. In FIG. 25B, a second sheet screen 290 is shown to have a hole 292 having a first sidewall 294 comprising upper and lower bevels 296, 298 which meet at about the mid-height of the hole 292. In FIG. 25C, a third sheet screen 300 is shown to have a hole 302 having a first sidewall 304 comprising three sections, i.e. an upper bevel 306, a straight wall section 307, and a lower bevel 308. In FIG. 25D, a fourth sheet screen 310 is shown to have a hole 312 having a first sidewall 314 comprising upper and lower bevels 316, 318 which meet below the mid-height of the hole 312. In FIG. 25E, a fifth sheet screen 320 is shown to have a hole 322 having a first sidewall 324 comprising upper and lower bevels 326, 328 which meet above the mid-height of the hole 322. Finally, in FIG. 25F, a sixth sheet screen 330 is shown to have a hole 332 having a first side wall 334 which slopes continuously inward from the top to the bottom of the hole 332.

Some embodiments include a low frequency vibrator in addition to an ultrasonic transducer. One such embodiment is the recoater 20 which is illustrated in FIGS. 3-5 and discussed above. Referring to those drawings, the recoater 20 includes an ultrasonic transducer 30 and a low frequency vibrator 32. The combination of the low frequency vibrations applied to the powder hopper and the ultrasonic frequency vibrations applied to the sheet screen is important to provide good control of the build powder dispensing in these embodiments.

Also important is the sequencing of the applications of these two types of vibrations. The two types may be applied simultaneously during the dispensing of build powder with both types being applied continuously. It has also been found to be advantageous to first apply the low frequency vibration for a short duration (e.g. 0.5 to 2 seconds) followed by the continuous application of the ultrasonic vibration. An advantage of using a combination of the two types of vibrations is that build powder can be made to flow from the hopper without bridging and come through the openings of the sheet screen as build powder pellets rather than as individual powder particles, thus preventing or diminishing the occurrence of powder fines being entrained in air currents and being carried away as a dust plume.

Figure 24:
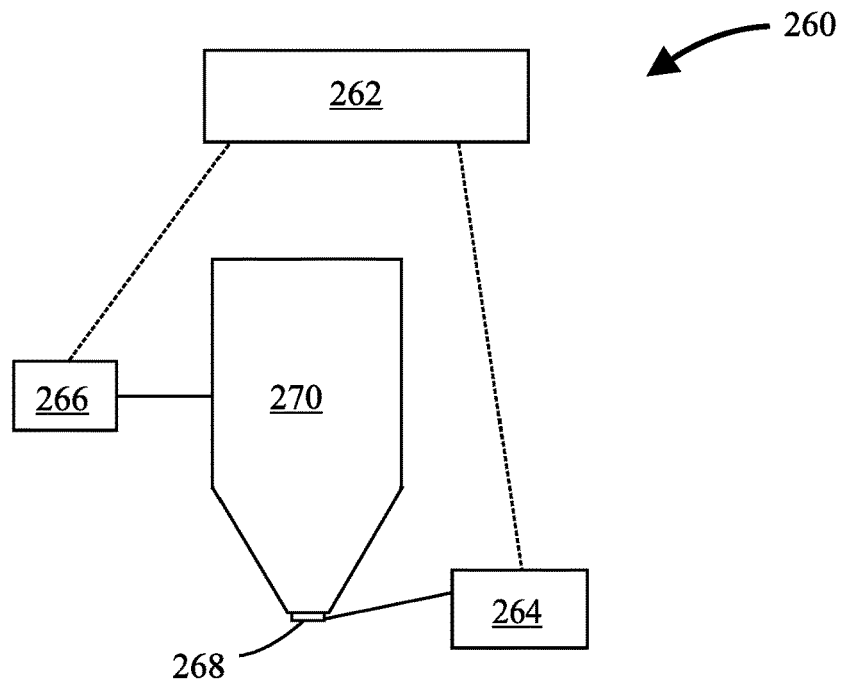
FIG. 24 is a schematic drawing showing a vibration control system of an embodiment.

FIG. 24 is a schematic drawing showing a vibration control system 260 of a recoater embodiment. The vibration control system 260 includes a vibration control unit 262 which is in operative communication (as indicated by the dashed relational lines) with at least one ultrasonic transducer, e.g. ultrasonic transducer 264, and at least one low frequency vibrator, e.g. low frequency vibrator 266. The ultrasonic transducer 264 and the low frequency vibrator 266 are, respectively, are operatively connected (as indicated by the solid relational lines) to a sheet screen 268 and a build powder hopper 270 of a powder-layer three-dimensional printer. The vibration control unit 262 may be a part of the overall control system of the powder-layer three-dimensional printer or separate therefrom. The vibration control unit 262 is adapted to cause the ultrasonic transducers and the low frequency vibrators to operate in any of the manners described above.

When used, the low frequency vibration may be provided in this system by a motor driven eccentric bearing system, e.g. low frequency vibrator 32 of FIG. 3, although other low frequency vibration devices can be used. The vibrations of such low frequency devices may be generated electronically, pneumatically, and/or mechanically. The low frequency vibration causes and/or enhances build powder flow within the hopper by eliminating or overcoming potential bridging or arching conditions in the hopper.

The sheet screens are preferably mounted in a holder which is, in turn, attached to the selected location on the build material hopper. An example of such an arrangement is shown in FIG. 6 as discussed above in which sheet screen 42 is mounted in holder 44. In some embodiments, the sheet screens are clamped between top and bottom sections of a holder. Bolts may be used to provide the clamping force and it is preferable that the clamping tension be uniformly applied to the screen, e.g. by adjusting each of the clamping bolts to the same torque level and alternating the tightening order of the bolts. The bolts may be the same as or different from the bolts that may be used to attach the holder to the hopper. Alternatively, the screens may be bonded to the holder using an adhesive. A preferred adhesive is a two part epoxy from Loctite called Ablestick 215. Welding or brazing may also be used to bond the sheet screen to a holder, but care must be taken to avoid warping the components during such bonding operations. Preferably, the sheet screen is mounted in a recess within the holder, the recess depth being approximately the same as or slightly more than the thickness of the sheet screen.

The sheet screen holder may be attached to the hopper by any securing means, e.g. by bolts, clamps, adhesives. It is also within the scope of the invention for all or a portion of the screen holder to be permanently fixed to the hopper, e.g. by welding or brazing, so long as a sheet screen can be attached to the screen holder in a manner that permits one sheet screen to be replaced by another. For example, a screen holder may have an upper portion permanently fixed to the hopper and a lower portion that can be removed to permit a sheet screen held between the two portions to be removed and replaced.

Some recoater embodiments have been successfully evaluated using stainless steel and silicon carbide fine powders. These powders include 316L with a $d_{50}$ of 9.5 microns and silicon carbide powders with $d_{50}$ of 11 microns and $d_{50}$ of 5 microns. Some aspects of the system have also been found to work with a larger powder, i.e. a stainless steel powder having a $d_{50}$ of 30 microns.

The distance from the bottom of the sheet screen to the powder bed surface may be any desirable distance. In some embodiments, it is preferable for the distance to be minimized so as to reduce the amount of pluming that may occur from the breakup of the pellets from bed impact.

Dust Collection System

The second aspect of the present invention is an improved dust collection system that localizes the collection of fine particles that have become suspended in the gaseous atmosphere, e.g. air, during the powder-layer three-dimensional printing process in the area immediately surrounding the build box. Although the dust collection systems of the present invention are usable with any type of powder-layer three-dimensional printer in which the three-dimensional printing is conducted under a gaseous atmosphere, for conciseness, the only atmospheric gas that will be mentioned in the ensuing discussion is air.

The dust collection system embodiments are designed to draw air from the perimeter of the build box down through the deck plate of the powder-layer three-dimensional printer. The air is ducted out through the powder-layer three-dimensional printer's enclosure portion, i.e. housing, to an external dust collector. It is to be understood that prior to use in any embodiment, a review of the filtration requirements for the build powder should be conducted to determine the relevant environmental health and safety concerns that may be associated with the build powder. Some standard dust collectors have HEPA filtration with up to 99.97% efficiency on particles 0.3 microns ($1.181 \times 10^{-5}$ inches) or larger. More aggressive filtration is necessary for powders having particle sizes smaller than is collectable by HEPA filtration.

Figure 17:
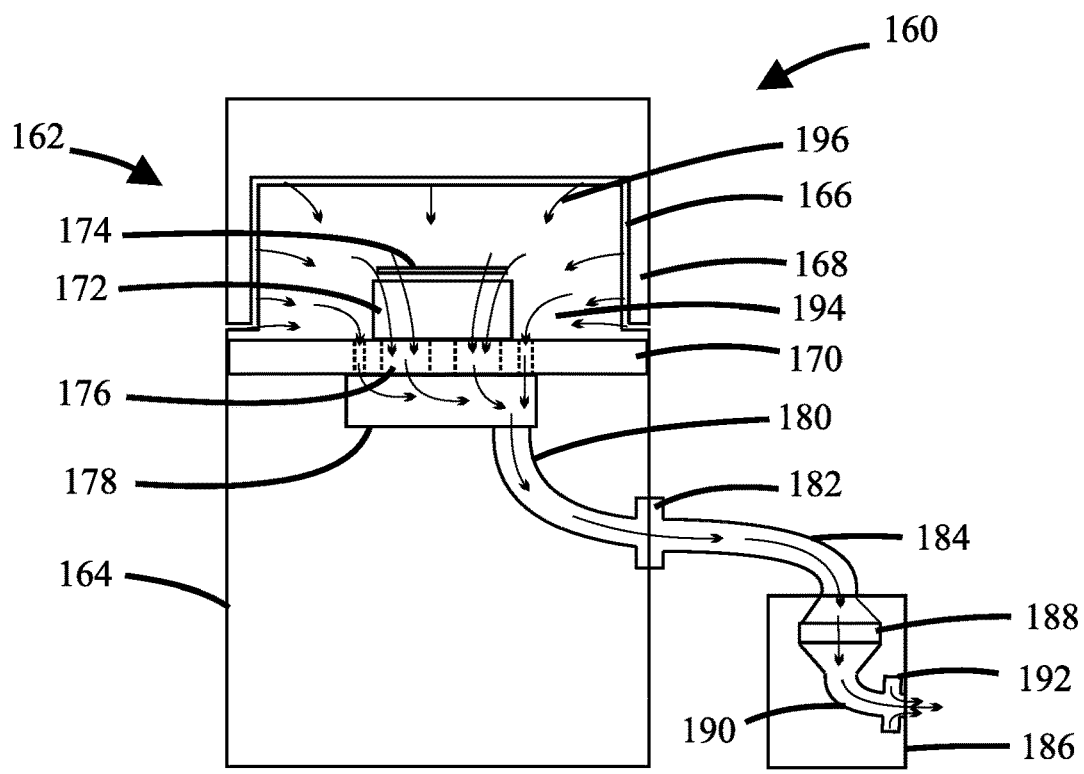
FIG. 17 is a schematic cross-sectional side view of a first dust collection system embodiment.
Figure 18:
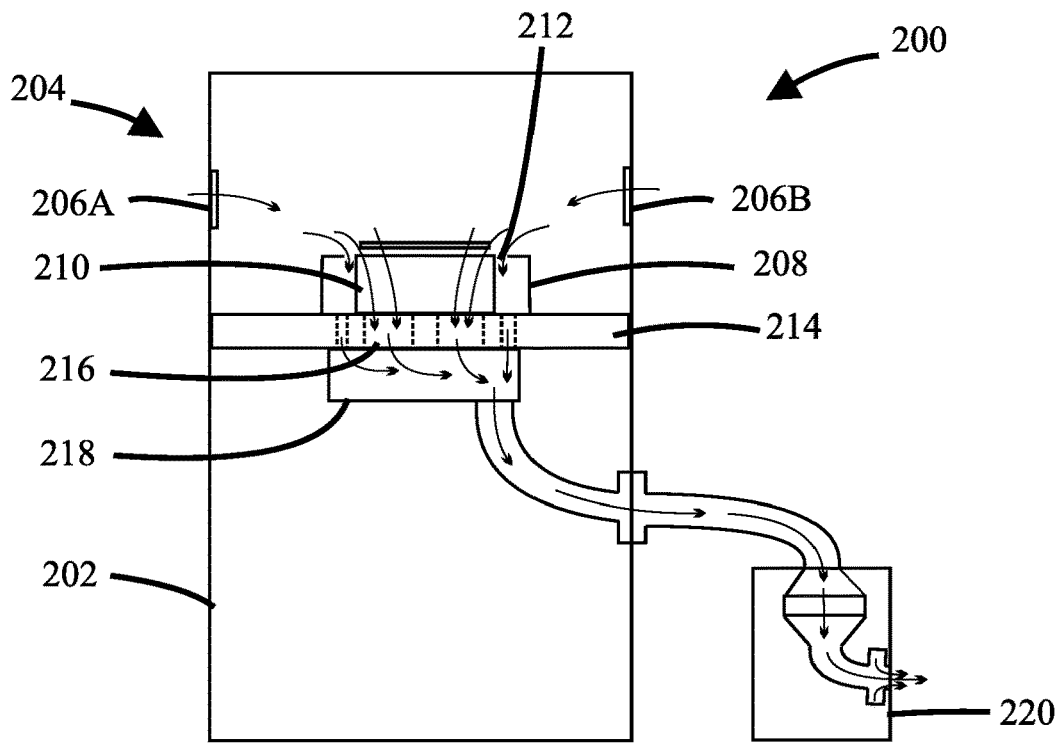
FIG. 18 is a schematic cross-sectional side view of a second dust collection system embodiment.

FIGS. 17 and 18 are schematic side-view cross-sectional drawings which illustrate dust collection system embodiments. FIG. 17 shows a first dust collection system 160. The first dust collection system 160 includes a first powder-layer three-dimensional printer printing station 162 which is enclosed in a housing 164. The housing 164 has one or more air leaks, e.g. an unsealed gap 166 around its lid 168, through which air can be drawn into the space enclosed by the housing 164.

Inside the housing 164 is a deck 170, which supports a build box 172, and a recoater 174, which periodically dispenses build powder into the build box 172. The deck 170 has a plurality of through passageways, e.g. passageway 176, which provide fluid communication between the atmospheres on the top and bottom sides of the deck 170. Proximal to and preferably attached to the bottom of the deck 170 is a plenum 178, which is in fluid communication with the bottom side of the passageways. The plenum 178 also is in fluid communication with a first exhaust duct 180 which extends to an exhaust port 182 in the housing 164. An external duct 184 extends between the outer side of the exhaust port 182 and a first external dust collection unit 186. The first external dust collection unit 186 includes a particulate filter 188, and a second exhaust duct 190 for expelling the filtered air back into the atmosphere exterior to the first dust collection unit 186, and a vacuum source 192.

The dispensing of build powder from the recoater 174 may cause some of the build powder to enter into the housing's internal atmosphere 194 around the build box 170, i.e. to plume. Another source of pluming may be the application of a smoothing device (not depicted) to the top of the build powder bed contained within the build box 172. Another source of pluming may be the transfer of build powder into the recoater 174 during the filling of the recoater 174.

The air flow during the operation of the first dust collection system 160 is depicted by thin arrows in FIG. 17, e.g. arrow 196. When the first external dust collection unit 186 is operated, air is drawn from outside of the powder-layer three-dimensional printer 162 through leaks in the housing 164, such as gap 166, into the interior of the housing 164. There it mixes with or entrains the powder-laden air of the atmosphere 192 and is then drawn through the passageways, e.g. the passageway 176, into the plenum 178. The air exits the plenum 178 through the exhaust duct 180 and then passes through the exhaust port 182 into the external duct 184 and therefrom into the first external dust collection unit 186. As the air then passes through the particle filter 188, the particle filter 188 removes therefrom (to the extent of its capability) the powder particles the air carries. The cleansed air is then expelled via the exhaust duct 190 into the atmosphere exterior to the first dust collection unit 188 or it can be further processed, collected, and/or exhausted.

Referring now to FIG. 18, the second dust collection system 200 which is depicted therein is the same as the first dust collection system 160 discussed above except with respect to the following features. The housing 202 of the second powder-layer three-dimensional printer printing station 204 does not have an unsealed gap around its lid (not depicted) through which air may enter into the interior atmosphere of the housing 202. Instead, the housing 202 is provided with a plurality of vents, e.g. the first and second vents 206A, 206B, which are designed for admitting air into the space inside of the housing 202. Such vents may include filters to prevent particulate matter from entering or exiting the powder-layer three-dimensional printer and may have one-way valves so that air can enter through them into the housing 202 but not exit out of the housing 202 through them. The second dust collection system 200 includes a shroud 208 which surrounds the build box 210 so as to create an annulus 212 around the build box which is in fluid communication with the passageways through the deck 214, e.g. the passageway 216, which are in fluid communication with the atmospheres on the top and bottom sides of the deck 214 and a plenum 218. Preferably, the annulus 212 is situated near or alongside of the top of the build box 210 so as to more efficiently draw the particle laden air from near the build box 210 before that air has a chance to migrate away from the vicinity of the build box 210.

When the second external dust collection unit 220 of the second dust collection system 200 is operated, air is drawn from outside of the powder-layer three-dimensional printer 200 into the interior of its housing 202 through the vents 206A, 206B. Air is also drawn from the top side of the deck 214 through the annulus 212 into the passageways, e.g. the passageway 214, and then into the plenum 218. From there, the air travels out of the housing 202 and into and through the external dust collection unit 220 in the same manner as was described above for the corresponding elements of the first dust collection system 160.

Figure 19:
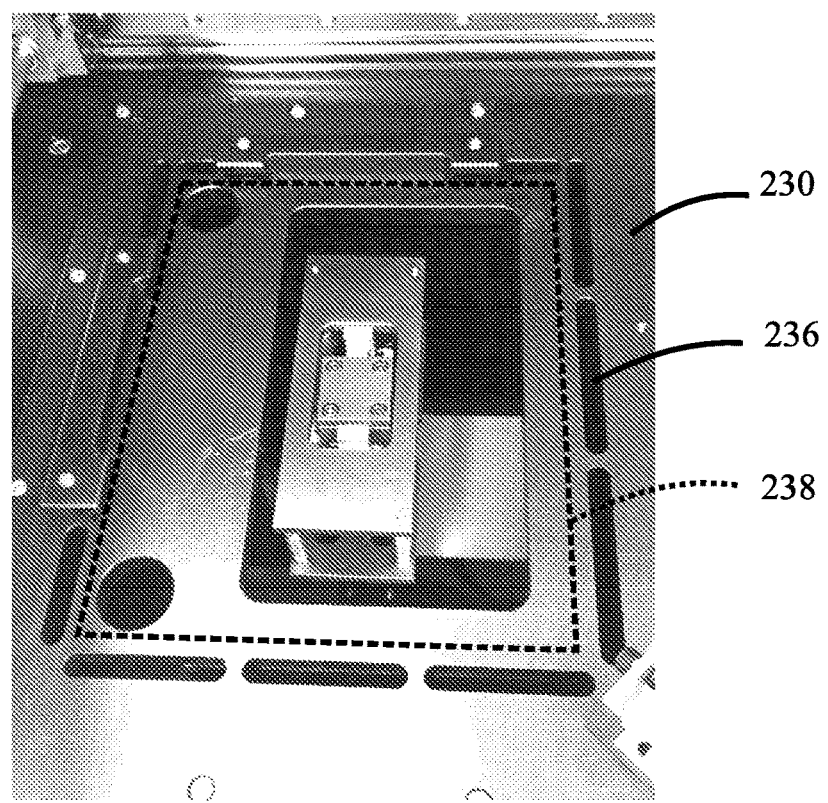
FIGS. 19-23 are photographs of portions of an actual dust collection system embodiment that was installed on an Innovent® powder-layer three-dimensional printer.
Figure 20:
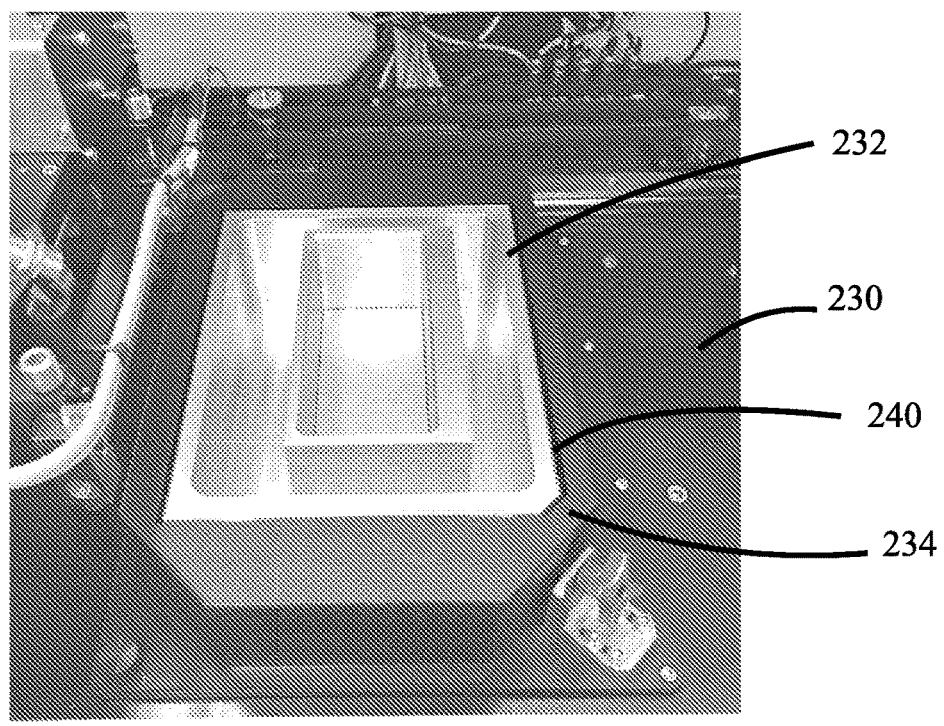
Figure 21:
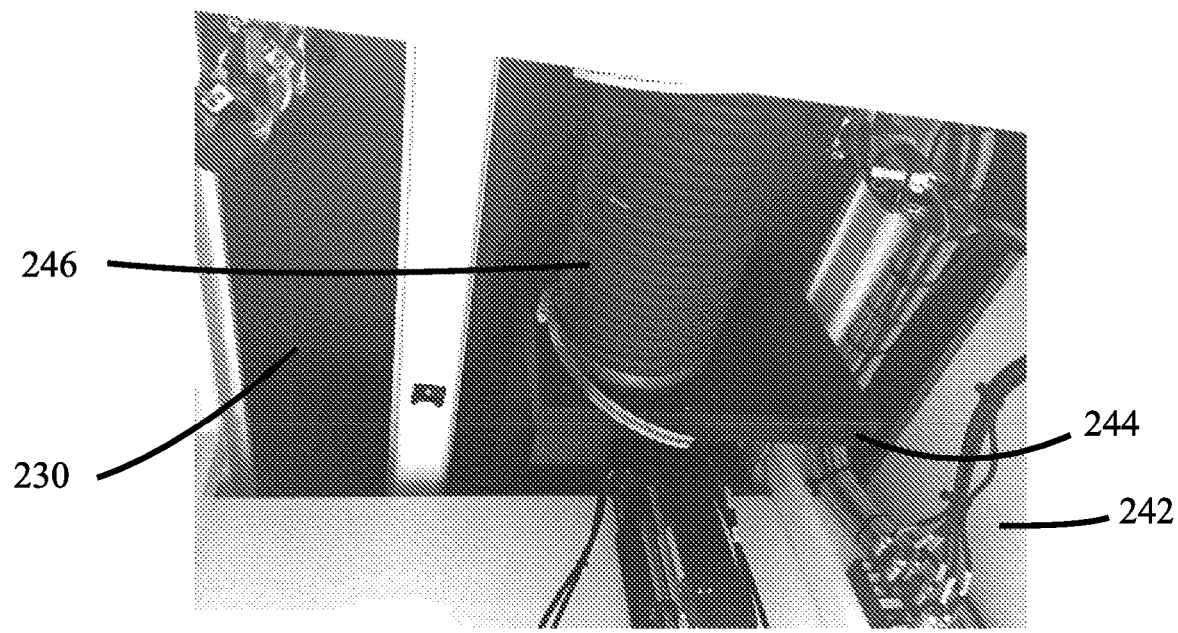
Figure 22:
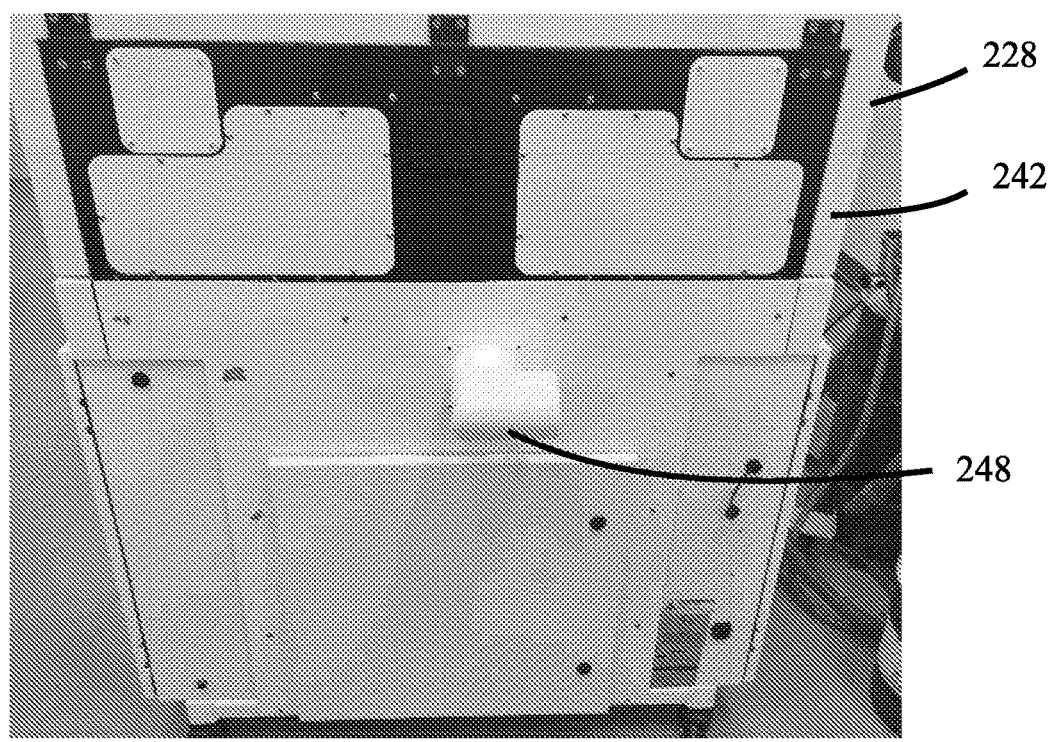
Figure 23:
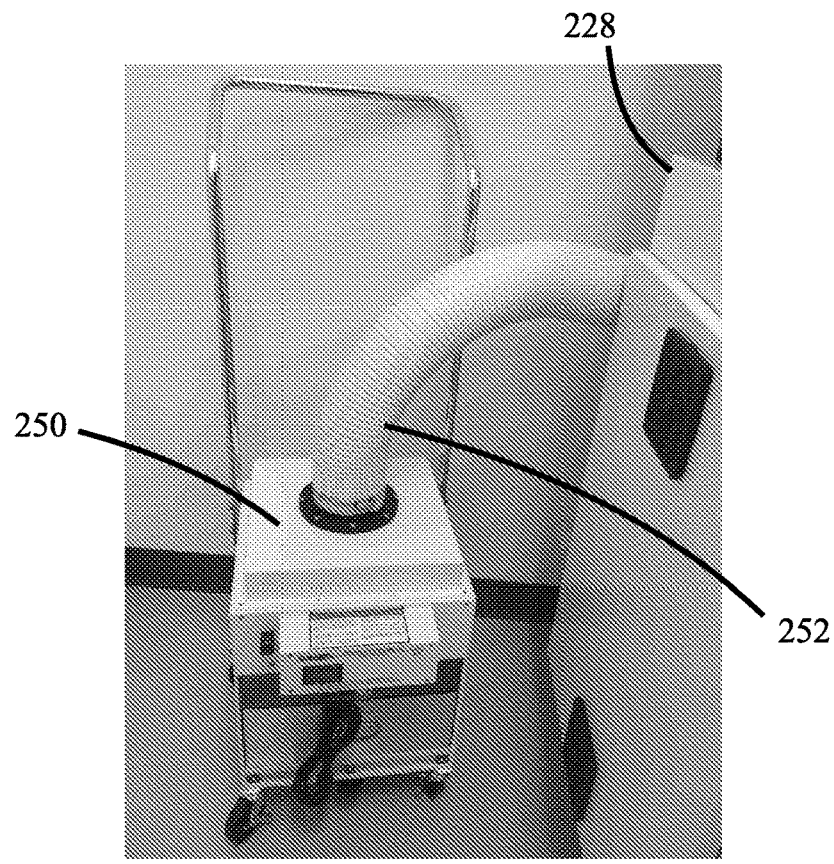

FIGS. 19-23 are photographs of a portions of an actual dust collection system embodiment that was installed on an Innovent® powder-layer three-dimensional printer 228. FIGS. 19 and 20 show, respectively the top of the deck 230 without either the build box 232 or the shroud 234 in place and with these items in place. The deck 230 includes a plurality of passageways, e.g. passageway 236, which are in fluid communication with the atmospheres on the top and bottom sides of the deck 230. Note that the bottom of the build box 232 seals off the portion of the deck 232 enclosed by the dashed-line rectangle 238. The shroud 234 and the build box 232 create between them the annulus 240 adjacent to the top of the build box 232 through which air can be drawn from around the build box 232 and through the passageways, e.g. the passageway 236. FIG. 21 shows a portion of the interior of the housing 242 of the powder-layer three-dimensional printer 228 below the deck 230. This view is looking upward at the bottom of the deck 230. In this photograph can be see a portion of the plenum 244 which is in fluid communication with the passageways through the deck 230. Attached to the plenum 244 is the exhaust duct 246 which is in fluid communication with the interior of the plenum 244. FIG. 22 shows the portion of the exterior of the powder-layer three-dimensional printer 228 at which the exhaust port 248 is attached to the housing 242. Though not shown in the drawings, the exhaust port 248 also extends through the housing 242 where it is attached to exhaust duct 246. In operation, an external duct (not present in FIG. 22) would be attached to the exterior side of the exhaust port 248 to convey the air exiting the exhaust port 248 to an external dust collection unit. FIG. 23 shows an external dust collection unit 250 to which is connected the external duct 252. Although not visible in this drawing, the external duct 252 is connected to the exhaust port 248 of the powder-layer three-dimensional printer 228.

The present invention also includes methods of making three dimensional articles by powder-layer three dimensional printing. Some embodiment methods include the step of dispensing a build powder from an ultrasonically vibrated sheet screen. Some embodiment methods include a step of pelletizing the build powder as it is being dispensed. Some method embodiments include a step of applying a low frequency vibration to the recoater hopper during the three-dimensional building process as described above.

Some embodiment methods include the operation of an embodiment of the dust collection systems described above during the three-dimensional printing process. Some embodiments include a step of dispensing a build powder from an ultrasonically vibrated sheet screen and the operation of an embodiment of the dust collection system during the three-dimensional printing process.

Although the apparatuses and methods of the present invention described herein are particularly beneficial when used with fine build powders, it is to be understood that the scope of the present invention includes the use of such apparatuses and methods with build powders of any size.

While only a few embodiments of the present invention have been shown and described, it will be apparent to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A powder-layer three-dimensional printer (2) comprising: a recoater (20) having a sheet screen (28) having a plurality of perforations (126) and a first side and a second side, an ultrasonic transducer (30) adapted to vibrate the sheet screen (28), and a hopper (26) adapted to provide a build powder to a first side of the sheet screen (28), wherein when the ultrasonic transducer (30) vibrates the sheet screen (28) the build powder from the hopper (26) is dispensed from the sheet screen second side via the perforations (126), a low frequency vibrator (32) adapted to apply vibrations to the hopper (26), and a vibration controller (262) in operative communication with the ultrasonic transducer (30) and the low frequency vibrator (32) and adapted to cause the ultrasonic transducer (30) and the low frequency vibrator (32) to operate at least one of simultaneously and non-simultaneously.

2. The powder-layer three-dimensional printer (2) of claim 1 wherein, when the ultrasonic transducer (30) vibrates the sheet screen (28) the build powder from the hopper (26) is dispensed from the sheet screen second side via the perforations (126) as build powder pellets (112).

3. The powder-layer three-dimensional printer (2) of claim 1 wherein, the hopper (26) is adapted to provide mass flow of the build powder to the sheet screen first side.

4. The powder-layer three-dimensional printer (2) of claim 1 wherein, the hopper (26) comprises a lower portion (60) proximate to the sheet screen (28) and an upper portion (58), the lower and upper portions (64, 58) being interconnected to form a continuous reservoir.

5. The powder-layer three-dimensional printer (5) of claim 1 further comprising, a sheet screen holder (78 & 110), the sheet screen holder (78 & 110) having first and second sides and an aperture extending therebetween, wherein the sheet screen (28) is attached to the sheet screen holder (78 & 110) so that at least some of the perforations (126) of the sheet screen (28) are in fluid communication with the aperture.

6. The powder-layer three-dimensional printer (2) of claim 5 wherein, the sheet screen (28) is bonded to the sheet screen holder (78 & 110) by an adhesive.

7. The powder-layer three-dimensional printer (2) of claim 1 wherein, the sheet screen second side is positioned at an angle of between 20 and 70 degrees to the horizontal.

8. The powder-layer three-dimensional printer (2) of claim 1 wherein, the ultrasonic transducer (30) is positioned at an angle to the horizontal so as be able to apply to the sheet screen (28) a vibration having both a horizontal component and a vertical component.

9. The powder-layer three-dimensional printer (2) of claim 1 wherein, the ultrasonic transducer (30) is adapted to sweep across a frequency range during its operation.

10. The powder-layer three-dimensional printer (2) of claim 1 wherein, at least one of the size, shape, and distribution of the perforations (126) of the sheet screen (28) is varied to reduce any tendency the recoater (20) otherwise would have to dispense build powder non-uniformly due to local vibration variances.

11. The powder-layer three-dimensional printer (2) of claim 1 wherein, at least one of the perforations (126) has a hole shape which includes at least one tine (154).

12. The powder-layer three-dimensional printer (2) of claim 1 further comprising, a trolley (22) adapted to carry the recoater (20).

13. The powder-layer three-dimensional printer (2) of claim 1 wherein, the recoater (20) further comprises at least one of a smoothing device (34), a drying device (36), and a curing device.

14. The powder-layer three-dimensional printer (2) of claim 1 further comprising, a housing (164) enclosing a space having a gaseous atmosphere, a horizontally disposed deck (170) dividing the space into an upper section and a lower section, a build box (172) positioned proximate to the deck (170) and at least in part of the space upper section, a plurality of passageways (176) through the deck (170) located so as to surround the build box (172) and providing fluid communication between the space upper and lower sections, a plenum (178) located in the space lower section and in fluid communication with the passageways (176), an exhaust duct (180) in fluid communication with the plenum (178), and a dust collection unit (186) located outside of the housing (164) and including a controllable vacuum source (192) and a filter (188) both in fluid communication with the exhaust duct (180), wherein when the vacuum source (192) is operated at least some of the gas of the gaseous atmosphere in the space upper portion is drawn through the passageways (176) and through the filter (188).

15. The powder-layer three-dimensional printer (2) of claim 14 further comprising, a shroud (208) surrounding the build box (172) and forming therebetween an annulus (212), the annulus (212) providing fluid communication between the space upper section and the passageways (176).

16. The powder-layer three-dimensional printer (2) of claim 14 wherein, wherein the housing (164) has at least one vent (206A) providing fluid communication between the gaseous atmosphere in the space upper section and an atmosphere outside of the housing (164).

* * * * *